(12) United States Patent
Tadhani et al.

(10) Patent No.: US 12,117,229 B2
(45) Date of Patent: Oct. 15, 2024

(54) INLINE VENDING UNIT

(71) Applicant: Ice House America, LLC, Moultrie, GA (US)

(72) Inventors: Manoj Tadhani, Peachtree City, GA (US); Kevin Coppock, Moultrie, GA (US); Troy Doom, Moultrie, GA (US)

(73) Assignee: Ice House America, LLC, Moultrie, GA (US)

( * ) Notice: Subject to any disclaimer, the term of this patent is extended or adjusted under 35 U.S.C. 154(b) by 213 days.

(21) Appl. No.: 17/840,692

(22) Filed: Jun. 15, 2022

(65) Prior Publication Data

US 2022/0307752 A1 Sep. 29, 2022

Related U.S. Application Data

(62) Division of application No. 16/547,525, filed on Aug. 21, 2019, now Pat. No. 11,391,502.

(60) Provisional application No. 62/720,915, filed on Aug. 21, 2018.

(51) Int. Cl.
*F25C 5/20* (2018.01)
*F25C 1/00* (2006.01)
*F25C 5/04* (2006.01)
*G07F 17/00* (2006.01)

(52) U.S. Cl.
CPC .................. *F25C 5/20* (2018.01); *F25C 1/00* (2013.01); *F25C 5/046* (2013.01); *G07F 17/0071* (2013.01)

(58) Field of Classification Search
CPC ... G06Q 20/18; G07F 13/025; G07F 17/0071; F25C 5/24; F25C 5/187; F25C 5/046; F25C 1/00; F25C 5/20; B65B 57/06; B65B 43/36; B65B 37/10; B65B 29/00; B65B 1/48; B65B 1/06; A47J 31/56
See application file for complete search history.

(56) References Cited

U.S. PATENT DOCUMENTS

| | | | |
|---|---|---|---|
| 3,151,668 A | 10/1964 | Edwin | |
| 5,112,477 A | 5/1992 | Hamlin | |
| 7,080,475 B2 | 7/2006 | Chirnomas et al. | |
| 9,625,198 B2 | 4/2017 | Dwyer | |
| 2013/0269383 A1* | 10/2013 | Dwyer | F25C 5/04 62/259.1 |
| 2016/0069602 A1 | 3/2016 | Tadhani et al. | |

* cited by examiner

*Primary Examiner* — Ana M Vazquez
(74) *Attorney, Agent, or Firm* — Brown & Michaels, PC

(57) ABSTRACT

An inline vending machine for ice and water vending installed within a store wall allowing a user to purchase ice and water without entering the store. A shipping frame for shipping and installation of the insulated wall into the store wall is also disclosed.

11 Claims, 28 Drawing Sheets

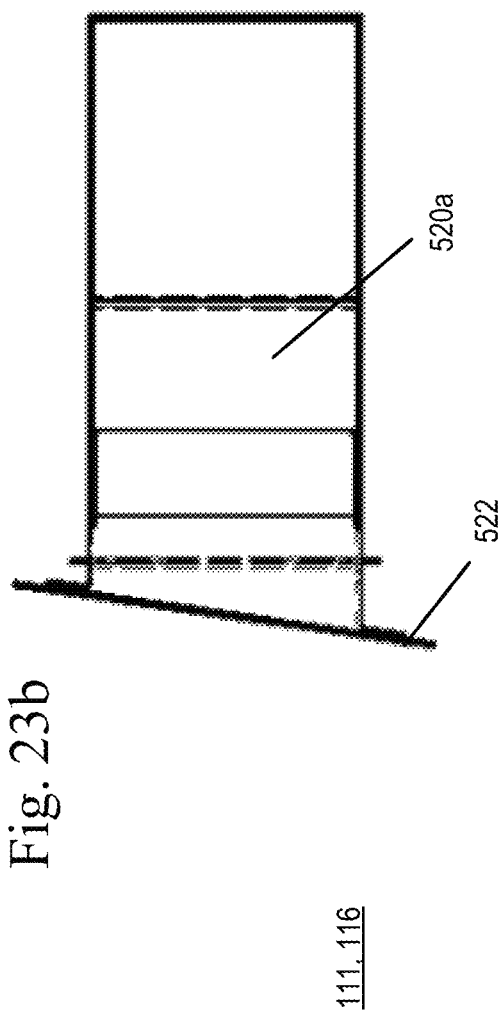
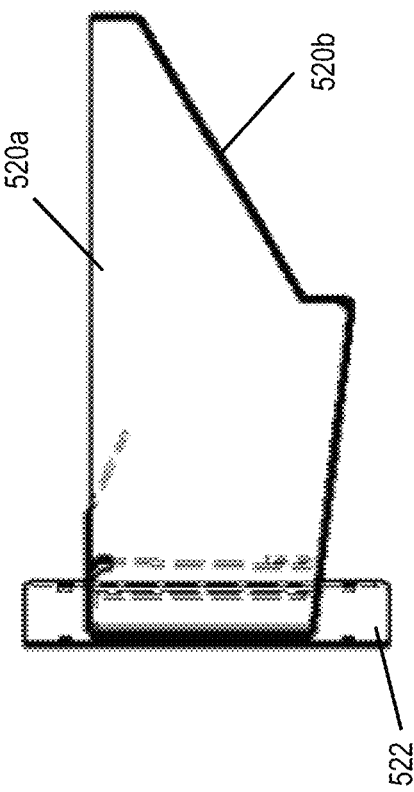
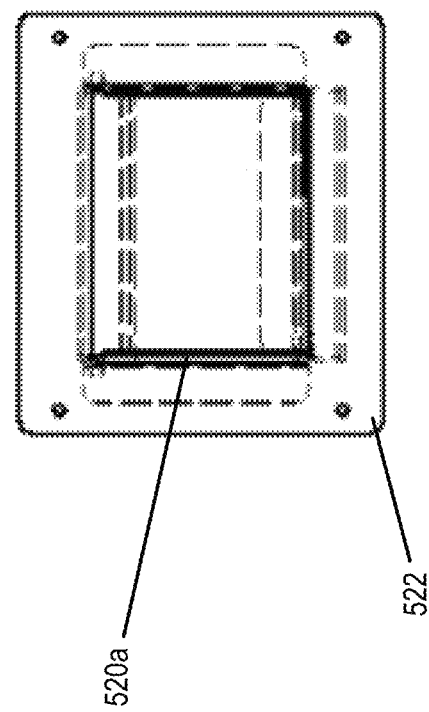
Fig. 23b
Fig. 23a
Fig. 22

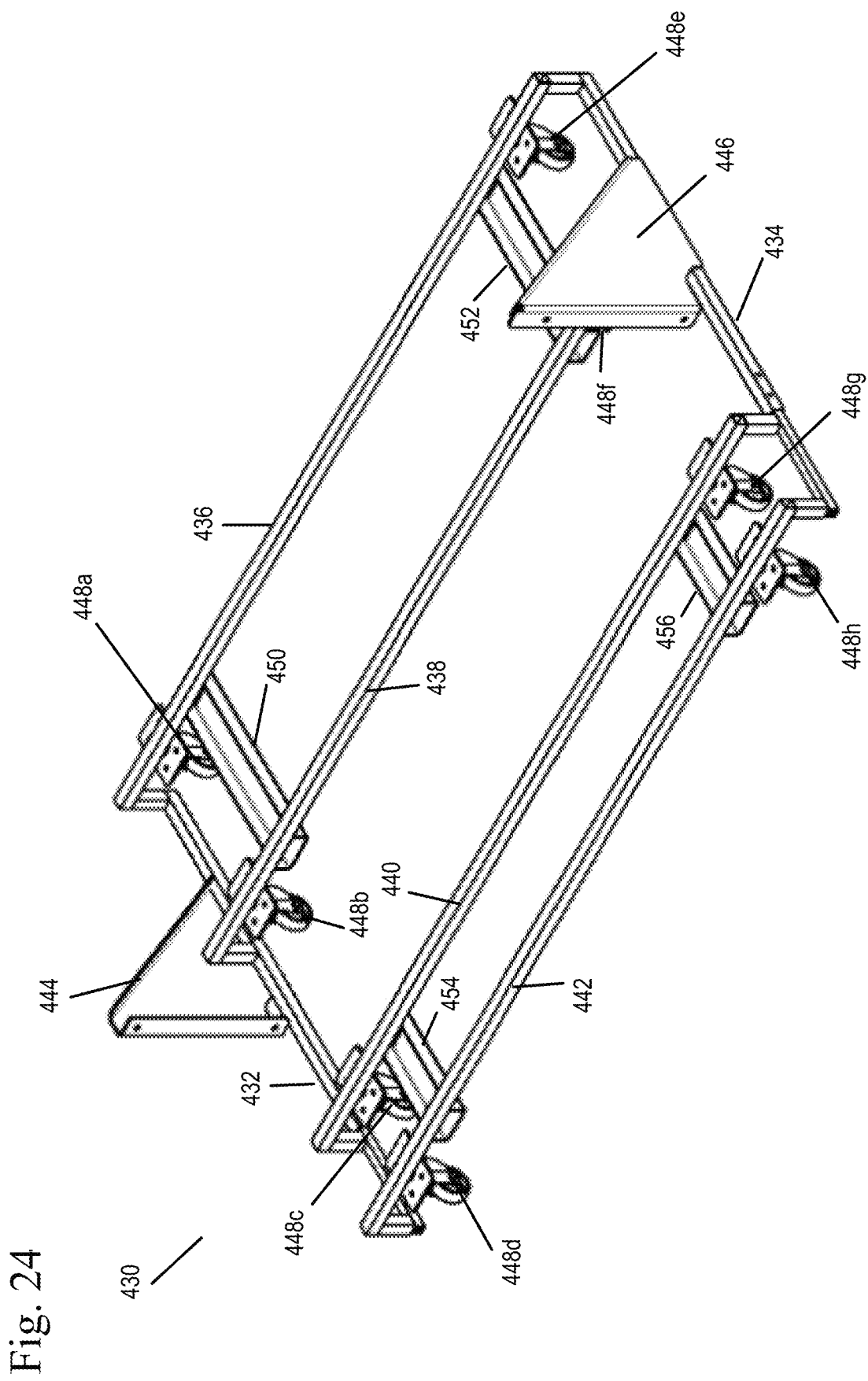

130

INLINE VENDING UNIT

REFERENCE TO RELATED APPLICATIONS

This application is a divisional application of U.S. application Ser. No. 16/547,525 filed Aug. 21, 2019, entitled "INLINE VENDING UNIT", which claims one or more inventions which were disclosed in Provisional Application No. 62/720,915 filed Aug. 21, 2018, entitled "INLINE VENDING UNIT". The benefit under 35 USC § 119(e) of the United States provisional application is hereby claimed, and the aforementioned applications are hereby incorporated herein by reference.

BACKGROUND OF THE INVENTION

Field of the Invention

The invention pertains to the field of vending units. More particularly, the invention pertains to inline vending units, preferably for dispensing ice and water.

Description of Related Art

Often times to purchase ice or water, a consumer or user has to enter a store. Most stores are not available for a consumer or user to enter twenty-four hours a day.

Free standing ice vending units are available to consumers or users twenty-four hours a day, but are subject to vandalism and theft as there is not a constant present by an employee monitoring the vending unit.

SUMMARY OF THE INVENTION

An inline vending machine for ice and water vending installed within a store wall allowing a user to purchase ice and water without entering the store. A shipping frame for shipping and installation of the insulated wall into the store wall is also disclosed.

The inline vending machine of an embodiment of the present invention allows customers to purchase products from outside of a store twenty-four hours a day through a consumer interface. The inline vending machine can be installed as part of a new building construction and sealed to a multitude of service or be retrofitted into existing buildings by removing a portion of the wall. The customer interface of the inline vending machine allows for cash collection and other maintenance items to be conducted securely from inside the store. Additionally, an ice maker and ice bin are present inside the store, which allows the inline vending machine to bag-ice inside the store utilizing and additional incline auger mechanism. An operator can additionally use the same ice bin to vend ice from within the store.

BRIEF DESCRIPTION OF THE DRAWING

FIG. 22 shows a front view of the coin return chute.

FIG. 23*a* shows a side view of the coin return chute.

FIG. 23*b* shows an alternate side view of the coin return chute.

FIG. 24 shows split design shipping frame to secure the insulated front wall assembly during shipping as well onside installation.

DETAILED DESCRIPTION OF THE INVENTION

Figure 1:
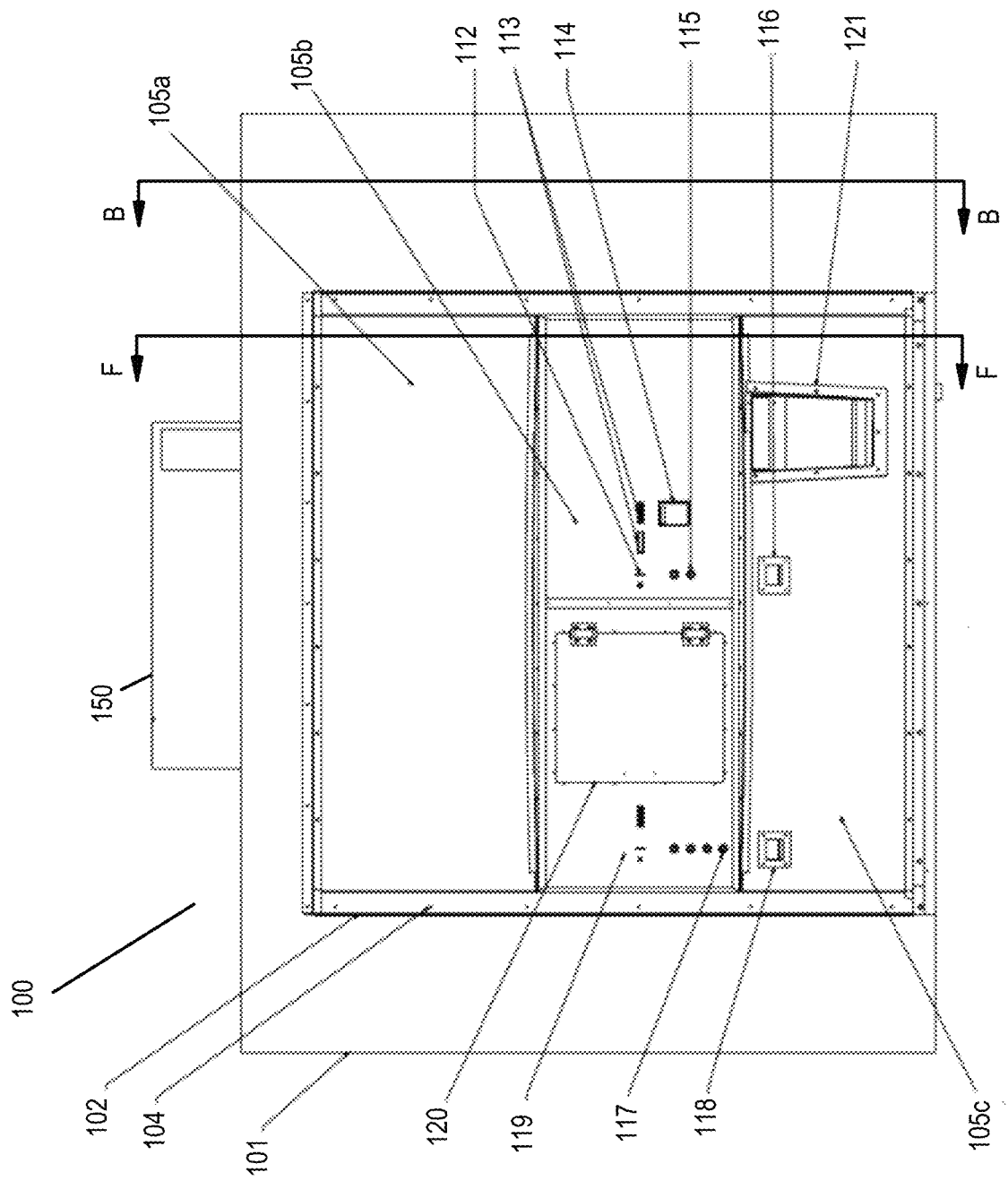
FIG. 1 shows an elevation view of the customer interface from outside of a building.
Figure 6:
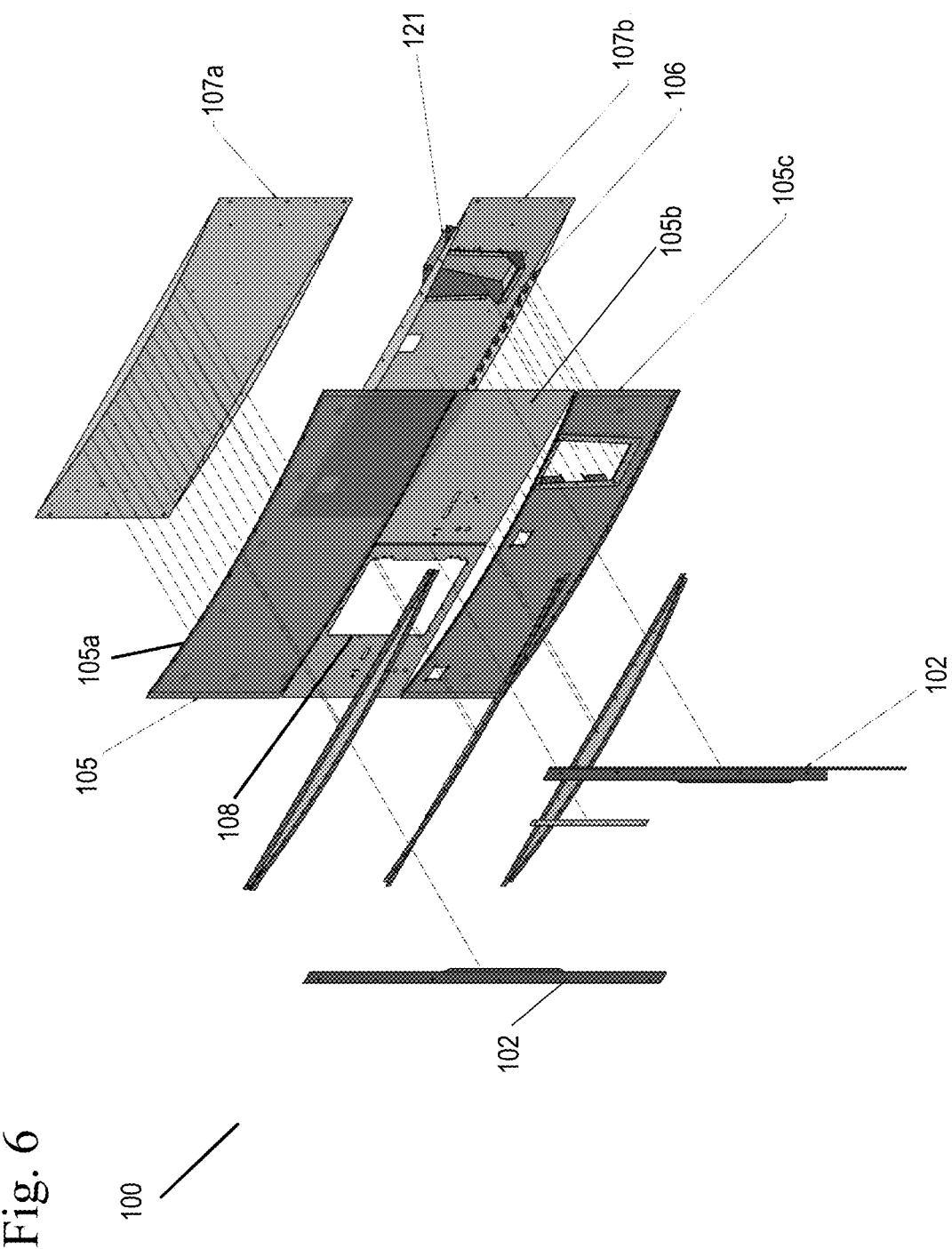
FIG. 6 shows an exploded view of the customer interface.
Figure 7:
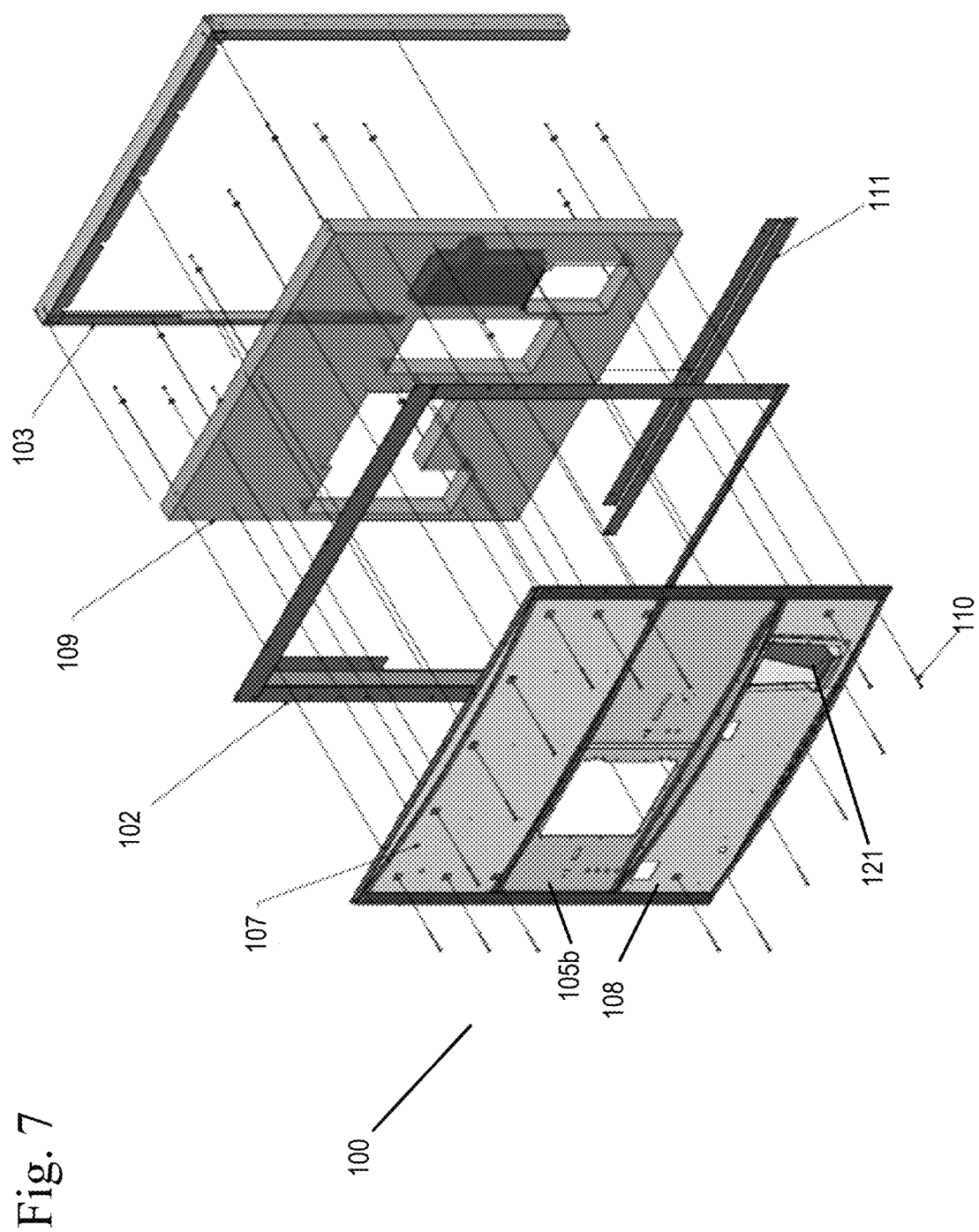
FIG. 7 shows an exploded view of the customer interface and trim relative to a wall of the building.

FIGS. 1, 6, and 7 shows an outer store wall 101 with a customer interface 100 outside of a store. The store may be any structure in which other goods, besides water and ice are sold, and/or a user or customer can enter. An example of a store may be, but is not limited to, a convenience store, a general merchandise store, a department store or a gas station. The customer interface 100 is set into or inline with the outer store wall 101 using inner wall trim 103 which receives an insulated front wall 109. Surrounding the perimeter of the insulated front wall 109 is an outer wall trim 102 and bottom trim 111 attached to the insulated front wall 109 through a plurality of fasteners 104. Attached to the insulated front wall 109, through a plurality of fasteners 110 is a vendor front back panel 107. The outer wall trim 102, the inner wall trim 103 and the bottom trim 111 provide protection against outer environmental elements entering the inside of the store or the space containing the ice vending machinery inside the store.

The vendor front back panel 107 has a top vendor front back panel 107*a* and a bottom vendor front back panel 107*b* with the bag chute 121 and a plurality of LED back lights 106. A top bubble front panel 105a is mounted to the top vendor front back panel 107a and a bottom bubble front panel 105c is mounted to the bottom vendor front back panel 107b. Between the top and bottom bubble front panels 105a and 105c is a flat panel 105b which has an opening 108 for vending water. The central flat panel 105b provides a customer interface for both water and ice. The top bubble front panel 105a and the bottom bubble front panel 105c are preferably made of polycarbonate. Stainless steel outer trim and fasteners can be used to secure the top bubble front panel 105a and the bottom bubble front panel 105c to the metal top vendor front back panel 107a and the metal bottom vendor front back panel 107b.

Referring back to FIG. 1, the customer interface 100 vends water and ice as well as allowing for payment of the water and ice by the customer without the customer having to enter the store. The customer, using their own receptacle, can place the water receptacle in the opening 108 covered by the water vendor user access door 120, select options associated with the water through the selection buttons 117 and make payment in the water vending payment area 119. If the customer pays using cash for the water, and is due change, coins are returned using the coin return chute 118. Adjacent to the water vendor user access door 120 is a vending area for ice. Ice is dispensed into a bag and provided to the customer in the bag chute 121. The customer selects options associated with the ice through the selection buttons 115 and makes payment using the bill validator 113, credit card reader 114, and/or coin insert slot 112. If the customer pays cash for the ice, and is due change, coins are returned to the customer using the coin return chute 111. The coin return chute for water 118, the coin return chute for ice 116 and the bag chute 121 are preferably located in the bottom bubble front panel 105c and the bottom vendor front back panel 107b.

FIGS. 22-23b shows the coin return chute for ice 111 and the coin return chute for water 116. The coin return chute 111, 116 has a bracket outer plate 522 which is mounted to a rectangular chute 520a which has an angled face 520b at an end thereof. The outer plate 522 is mounted to the outside of the curved bottom bubble front panel 105c. The angled face 520b accommodates installation of coin return chute over bubbled/curved surface 105c.

Figure 20:
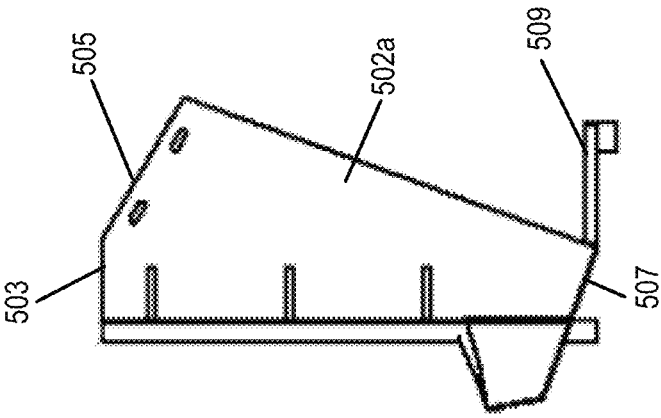
FIG. 20 shows a top view of the bag chute.
Figure 19:
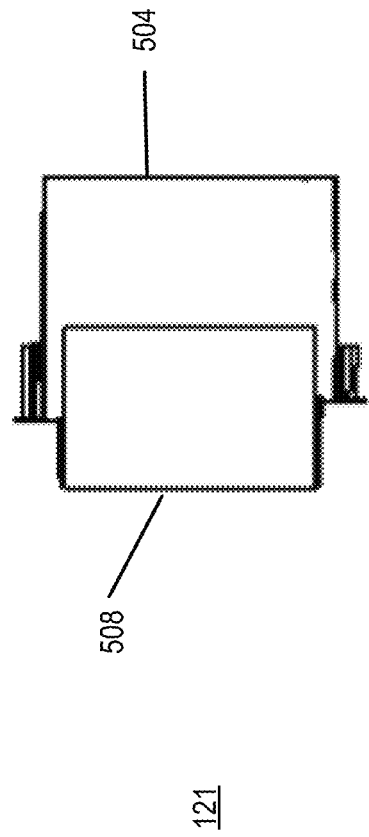
FIG. 19 shows a front view of a bag chute.
Figure 21:
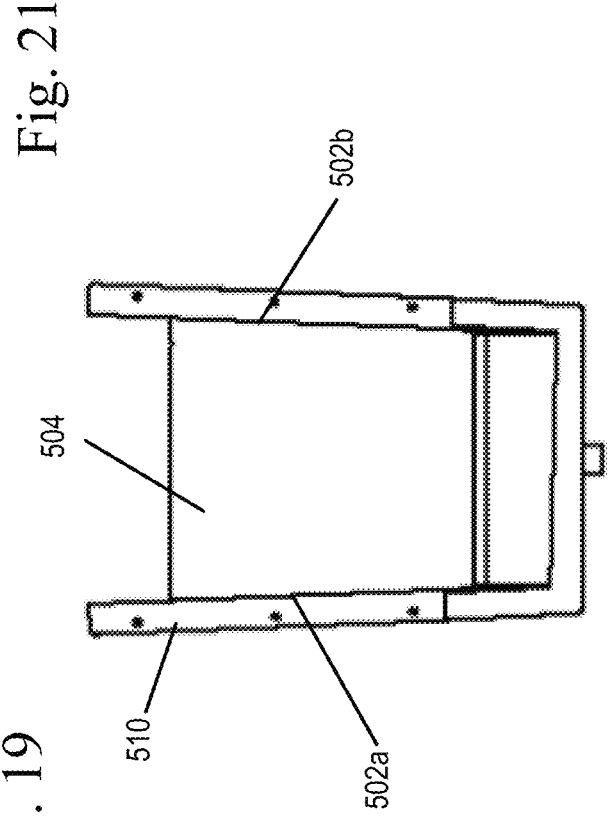
FIG. 21 shows a side view of the bag chute.

FIGS. 19-20 show the bag chute. The bag chute 121 is defined by a first side 502a, a second side 502b, and a front plate 504. The first side 502a and the second side 502b of the bag chute 121 each have a first end 503 with a curved surface 505 and a second end 507 mounted to a bottom plate 509. Bag chute 121 is secured to the outside of the curved bottom bubble front panel 105c with trim 510. Above the first end 503 of the bag chute 121 is a roll of bags 508 which can dispense a bag into the bag chute 121 such that when ice is dispensed into a bag, the bag rests on the bottom plate 509. The bag chute 121 allows vending of any bag size ranging from 10 inches to 12.5 inches in width.

Figure 4:
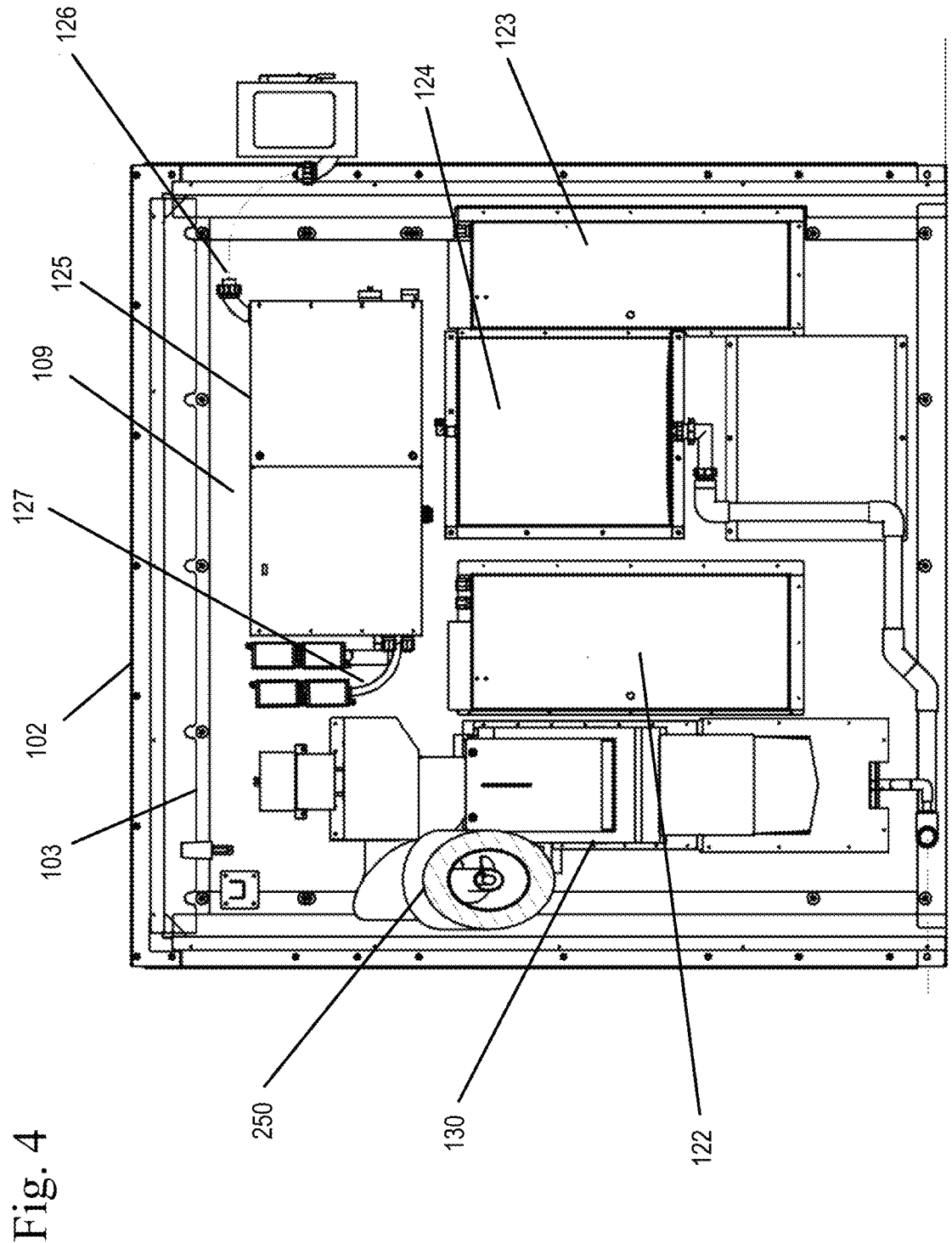
FIG. 4 shows a sectional view along line C-C of FIG. 3.
Figure 5:
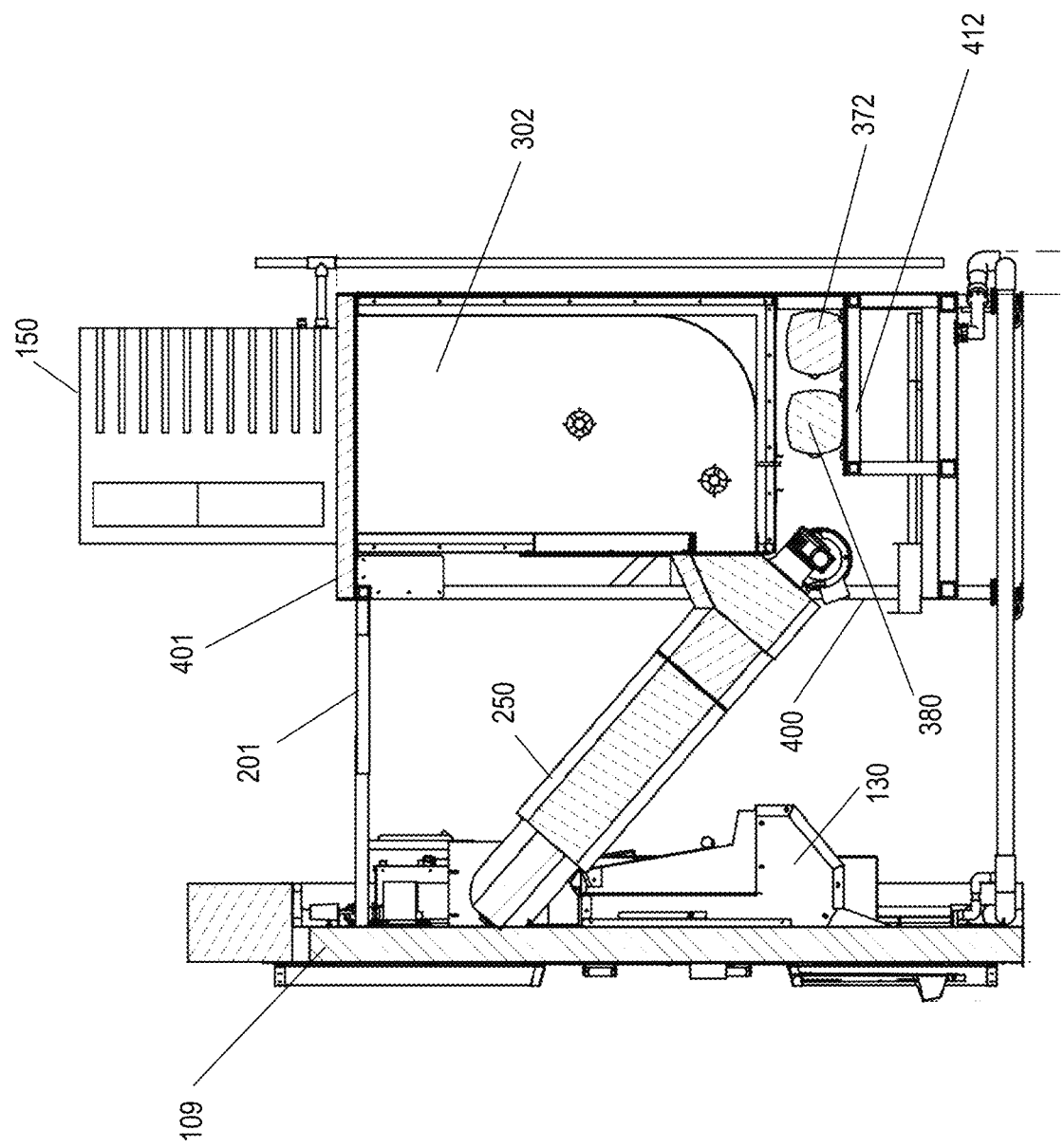
FIG. 5 shows a sectional view along line F-F of FIG. 2.

FIG. 4 shows a back view of the insulated front wall 109. An electrical control box 125 includes an electrical power IN 126 and an electrical power OUT 127 which provides electricity to electrical components of the customer interface, such as the LED backlights 106 and vending machinery including, but not limited to, the bagging mechanism 130, ice payment area 122 and water payment box 123 and water vendor 124.

Figure 2:
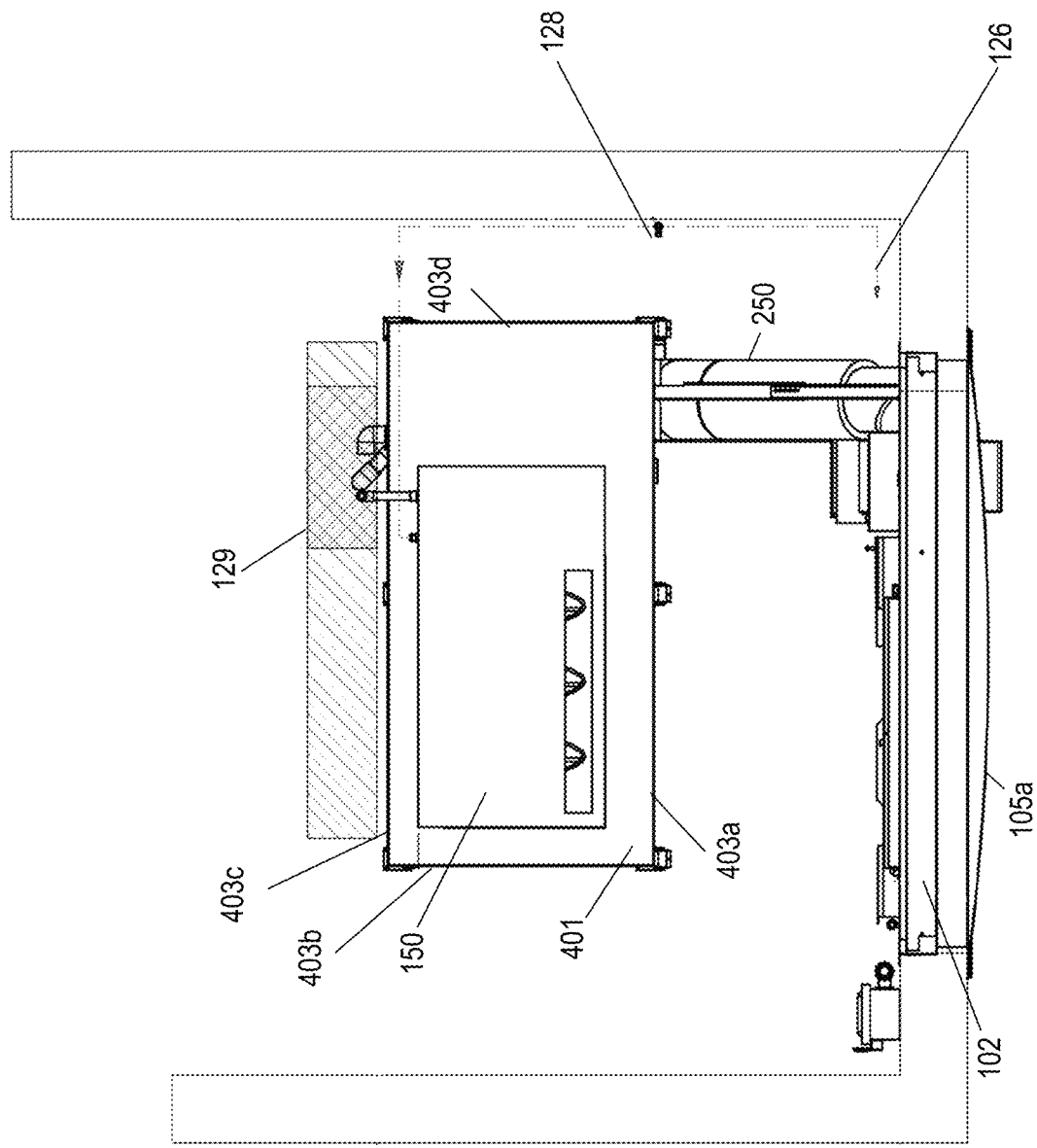
FIG. 2 shows a top plan view of the inline vending machine.
Figure 3:
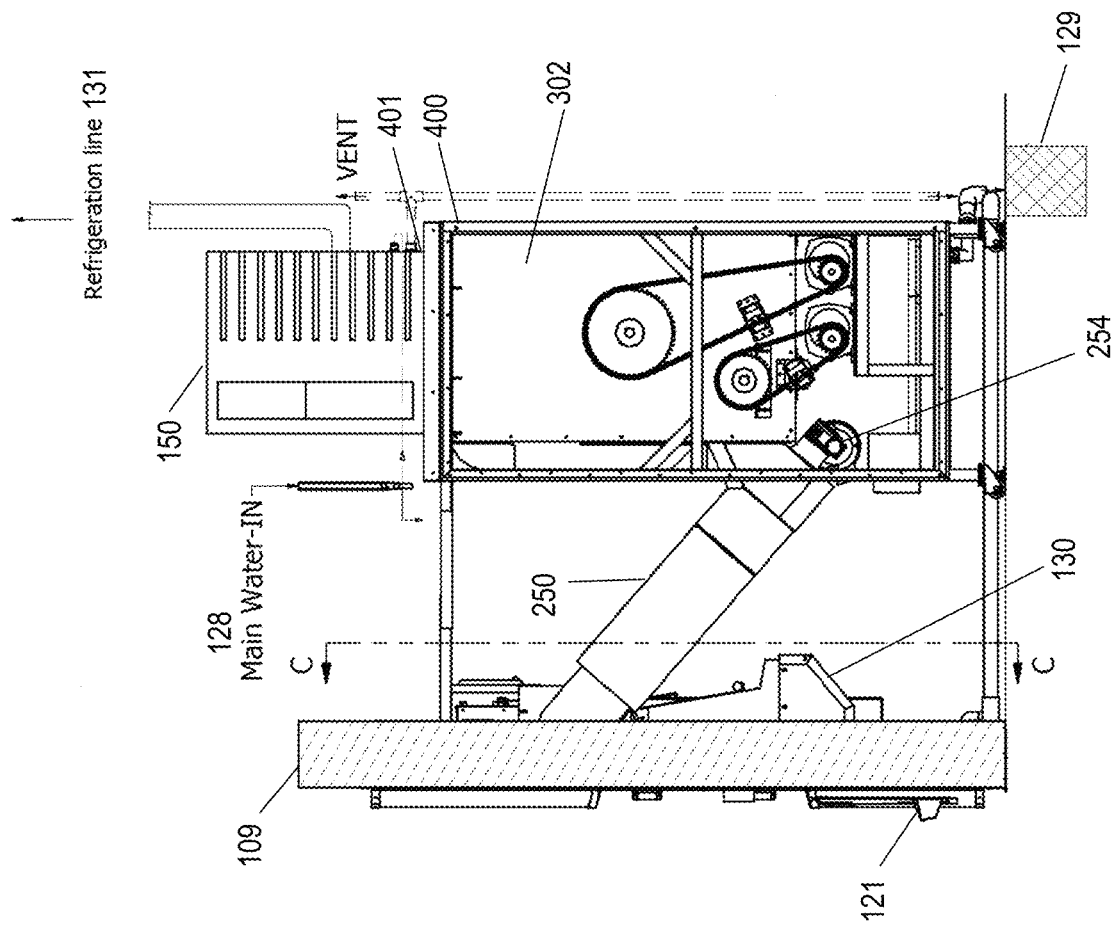
FIG. 3 shows a section view along line B-B of FIG. 2.
Figure 29A:
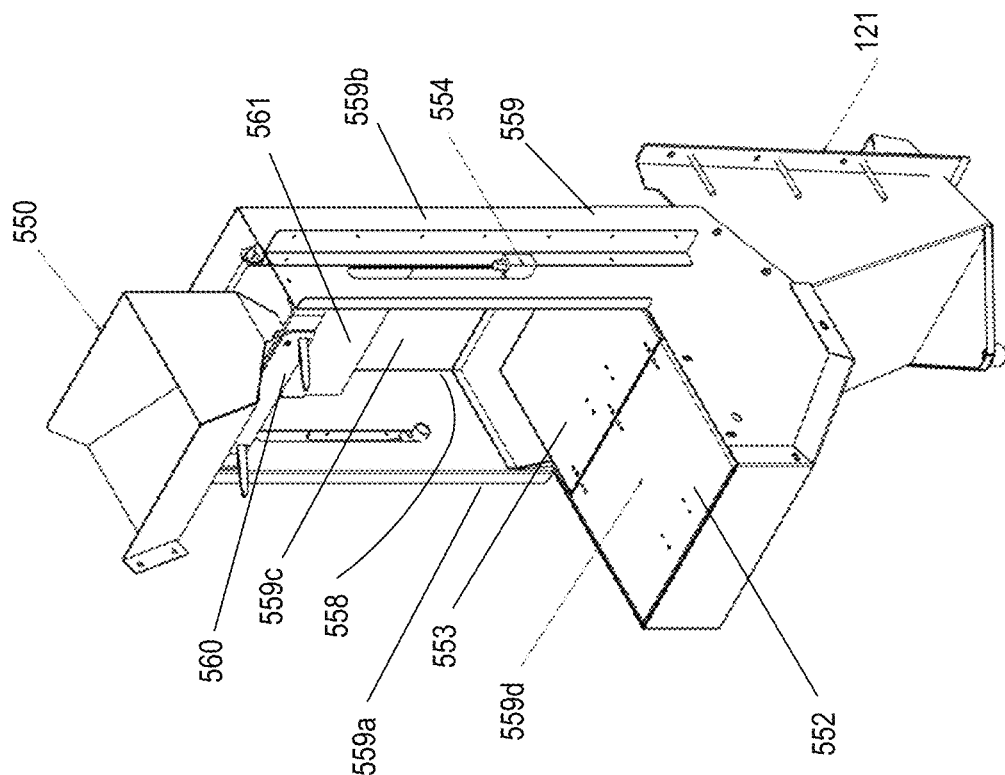
FIG. 29*a* shows a perspective view of a bagging mechanism.
Figure 29B:
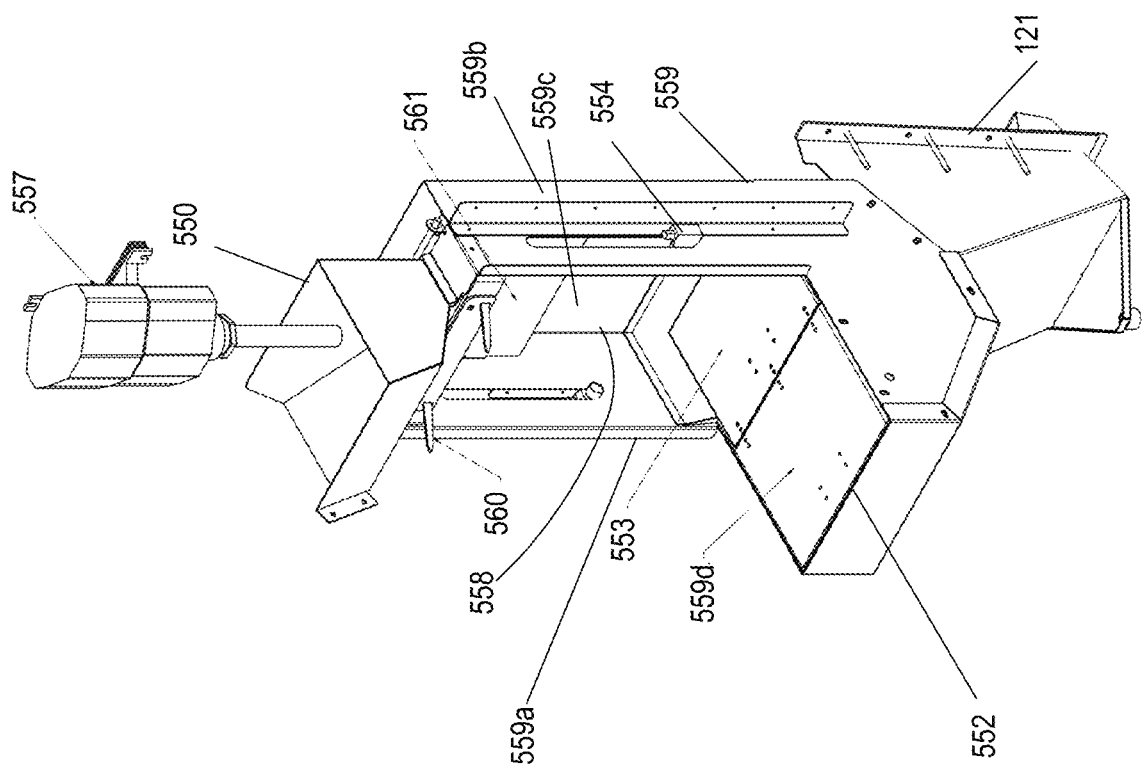
FIG. 29*b* shows another perspective view of the bagging mechanism including the blower.
Figure 30A:
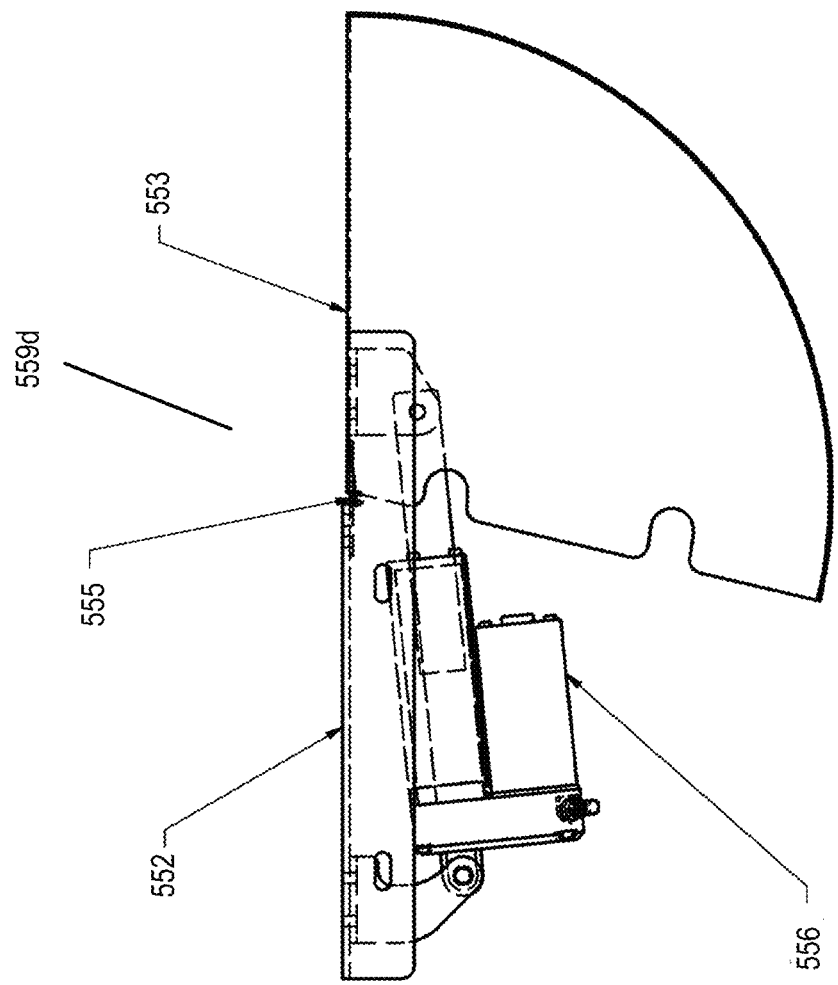
FIG. 30*a* shows a side view of the drop mechanism of the bagging mechanism.
Figure 30B:
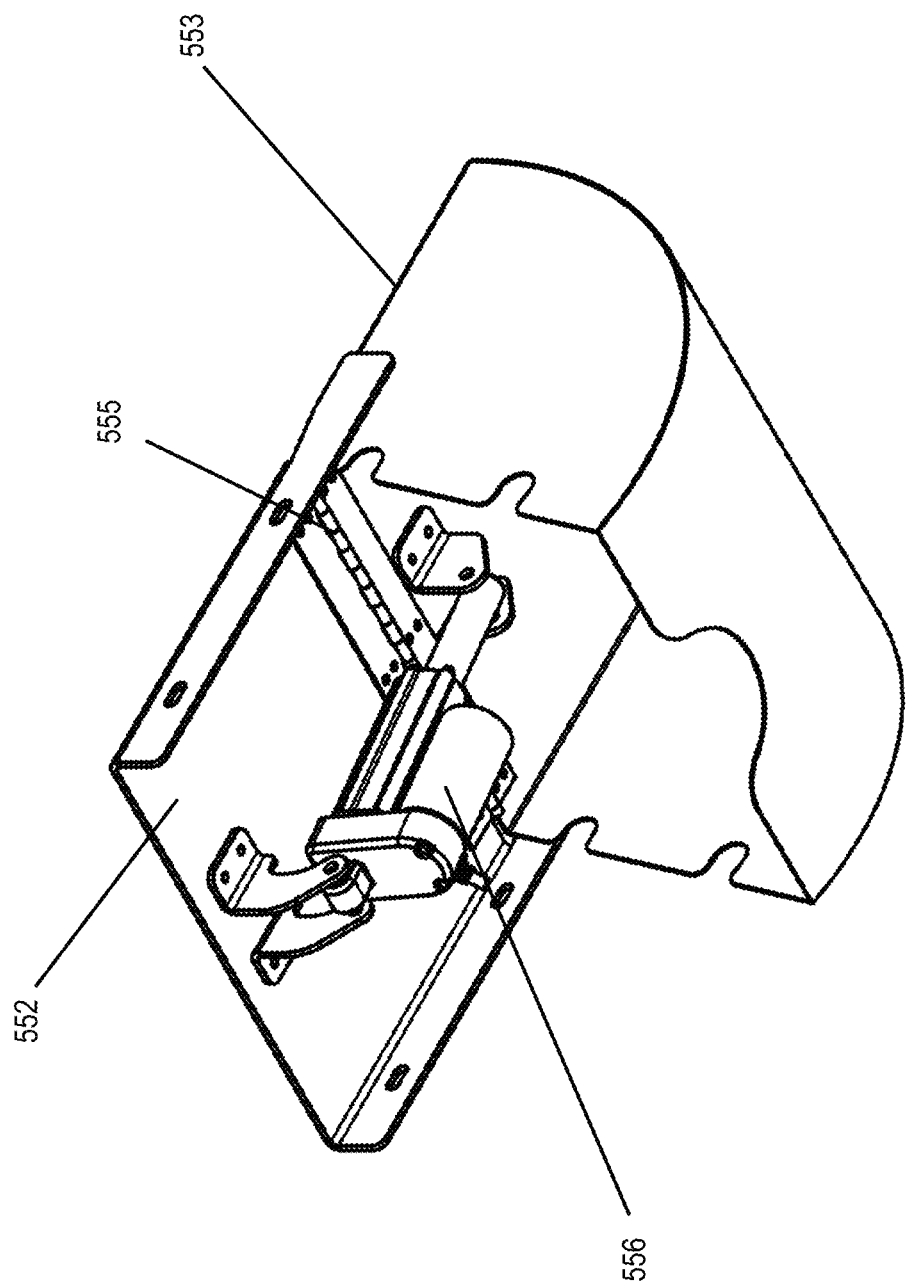
FIG. 30*b* shows a bottom perspective view of the drop mechanism of the bagging mechanism.

Referring to FIGS. 2-3, the ice bagging mechanism 130 is coupled to an vertical incline auger assembly 250 and an ice hopper 550 which supplies ice generated by the ice maker 150 and present in ice bin 302. The ice bagging mechanism 130 is shown in greater detail in FIGS. 29-30b. The ice maker 150 and ice bin 302 are stored on a rolling rack 400 shown in FIGS. 8-10. The ice maker 150 is coupled to a refrigeration line 131 and a water in line 128. The incline vertical auger assembly 250 spaces the rolling rack 400 a distance from the back of the insulated front wall 109. The distance is preferably at least 32 inches. The distance allows for routine and critical service and maintenance.

Referring to FIGS. 29a-30b, the bagging mechanism 130 includes an ice hopper 550 which supplies ice to space 558 defined by an ice bagging structure 559 consisting of two side panels 559a, 559b, a back panel 559c and a bottom panel 559d which has a fixed bottom panel 552 and a rotating bottom panel 553. The bagging mechanism 130 also includes a blower 557 which blows open a bag held by the bag holder 560 which drops into the space 558 where the rotating bottom panel 553 supports the bottom of the bag. Also present within the space 558 is a bag detect flap 561. A sensor (not shown) may be present behind the bag detect flap 561 which detects when the bag is present in the space 558, fully blown open, and ready to be filed with ice. The sensor (not shown) sends a signal via a controller (not shown) to start the auger motors 372, 380. Ice level sensors 554 are additionally present within the space 558 to monitor for the level of ice present within the bag. The ice level sensors 554 includes a transmitter to transmit electrical signals regarding the level of the ice or a simple on or off command with regards to providing ice to the bagging mechanism 130 for the bag to the controller controlling the auger motors 372, 380 and a receiver to receive an electronic signal regarding the ice level in the bag. As soon as the ice within the bag reaches a predetermined amount, the ice level sensors 554 transmit a signal to the auger motors 372, 380 to stop and to initiate the actuator 556 located beneath the fixed bottom panel 552 and the rotating bottom panel 553 to actuate the rotating bottom panel 553 to rotate about hinge 555, such that the filled bag of ice drops into the bag chute 121. The actuator 556 may be electrically operated or may be pneumatic.

Figure 8:
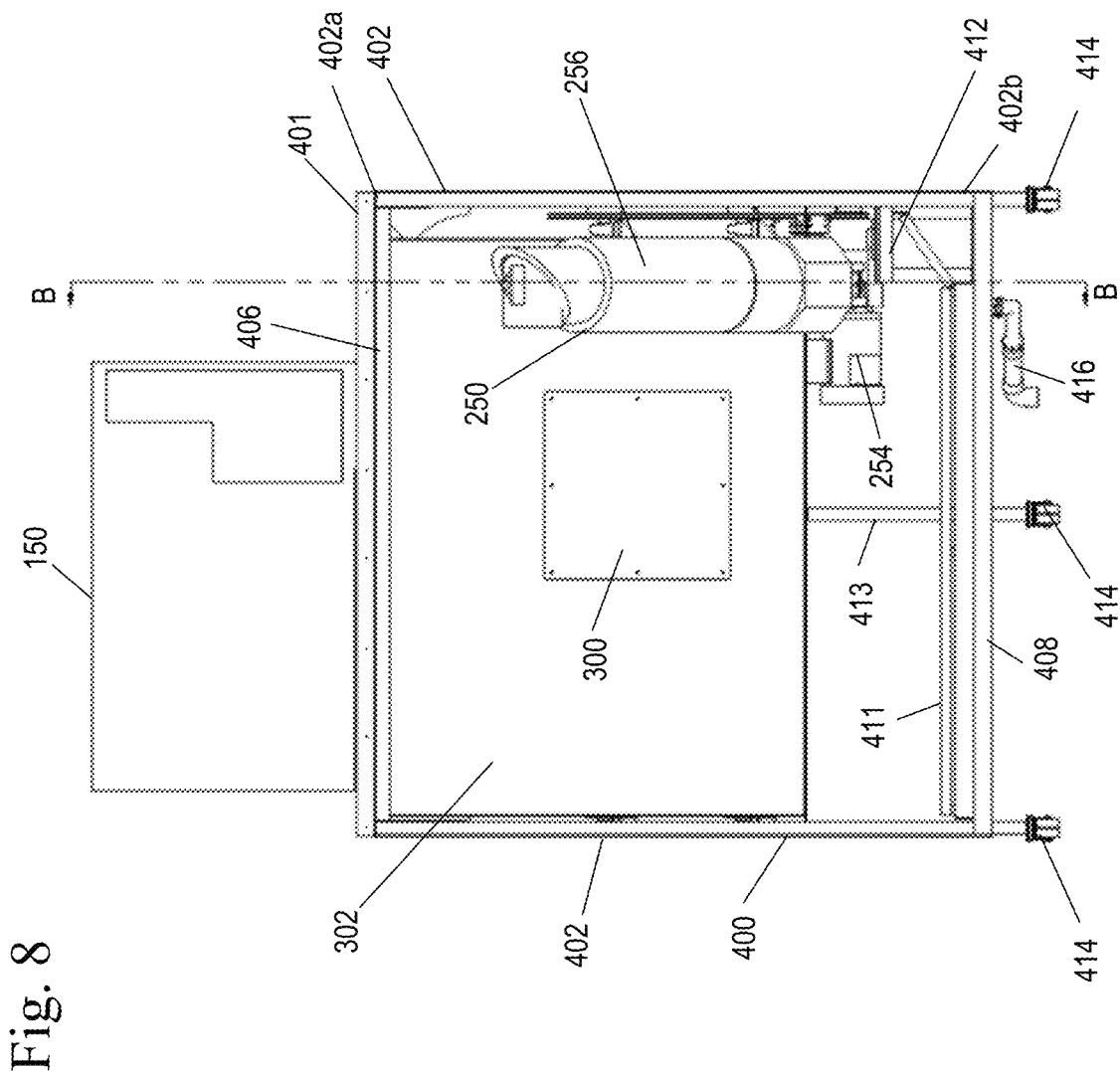
FIG. 8 shows a front view of the machinery associated with ice production.
Figure 9:
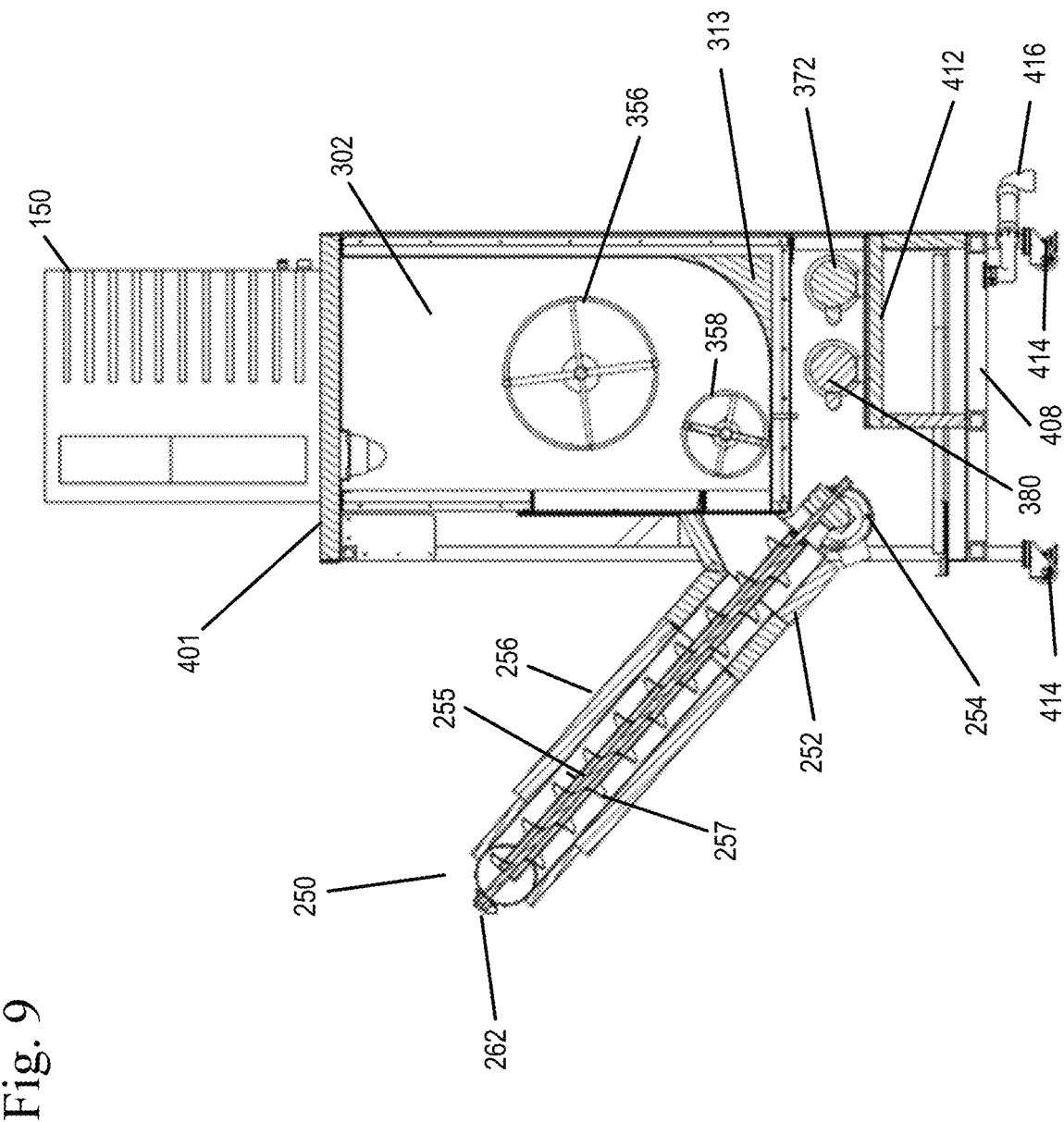
FIG. 9 shows a side view of the machinery associated with ice production along line B-B of FIG. 8.
Figure 10:
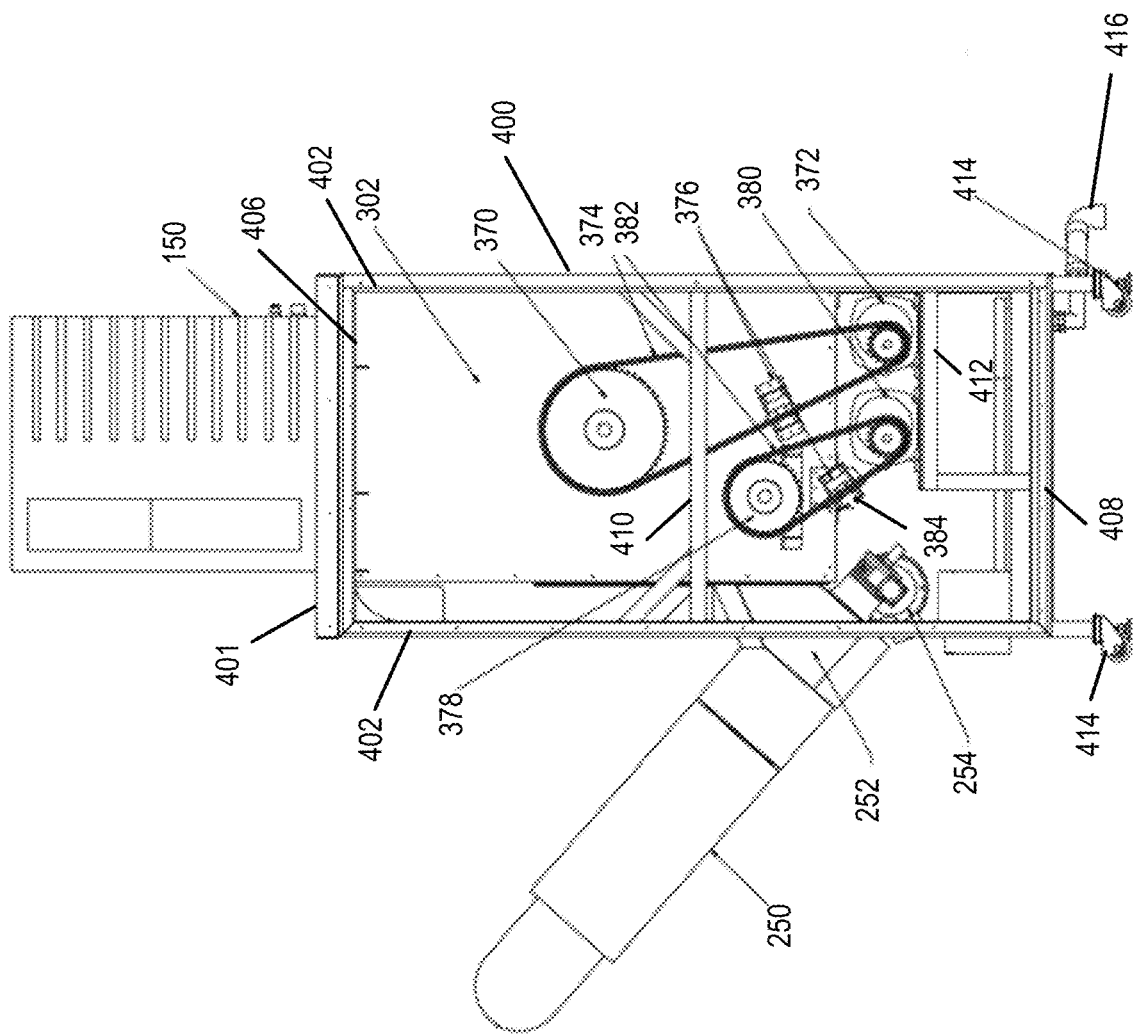
FIG. 10 shows an alternate side view of the machinery associated with ice production.
Figure 11:
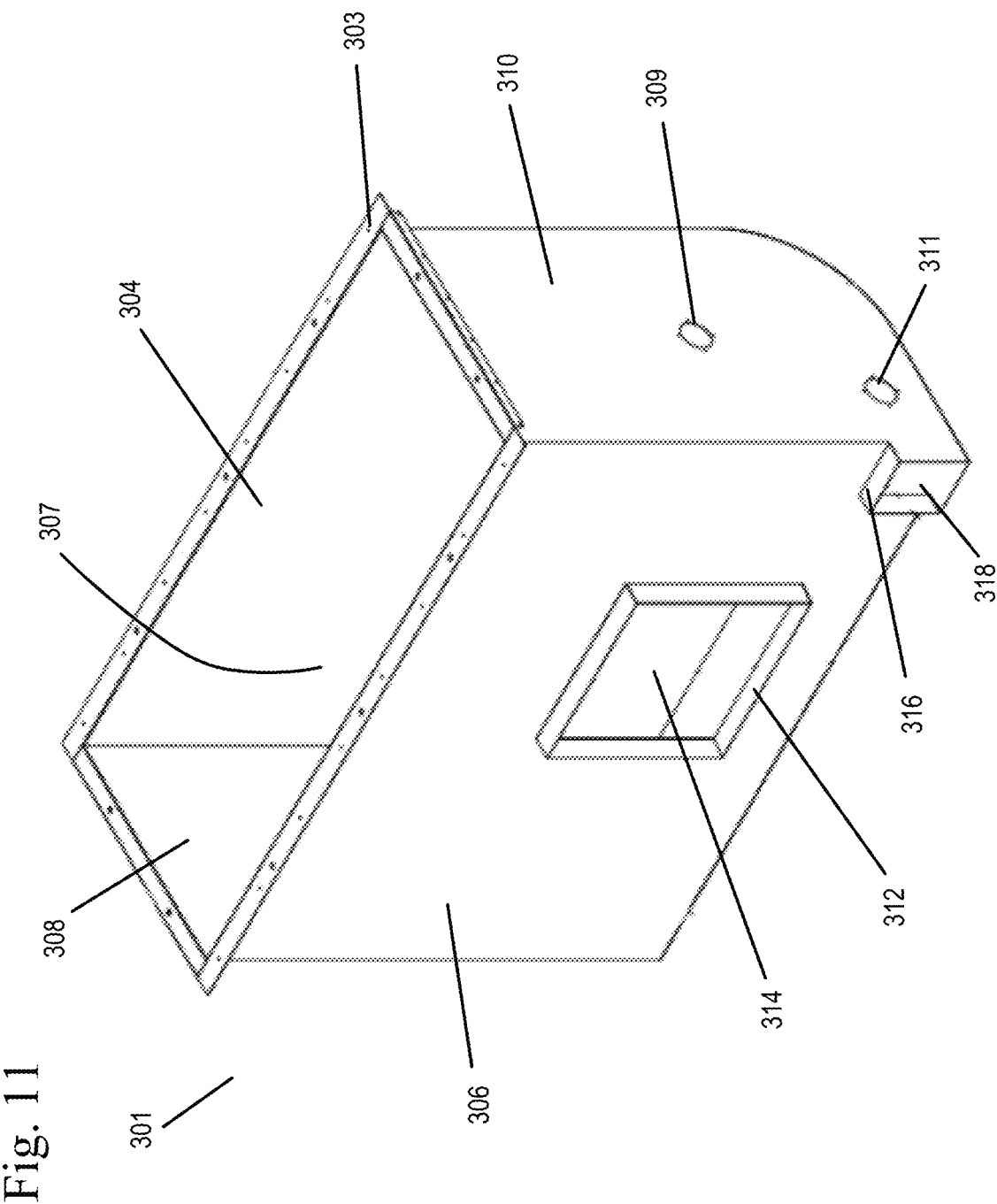
FIG. 11 shows an inner sleeve of the ice storage bin.
Figure 12:
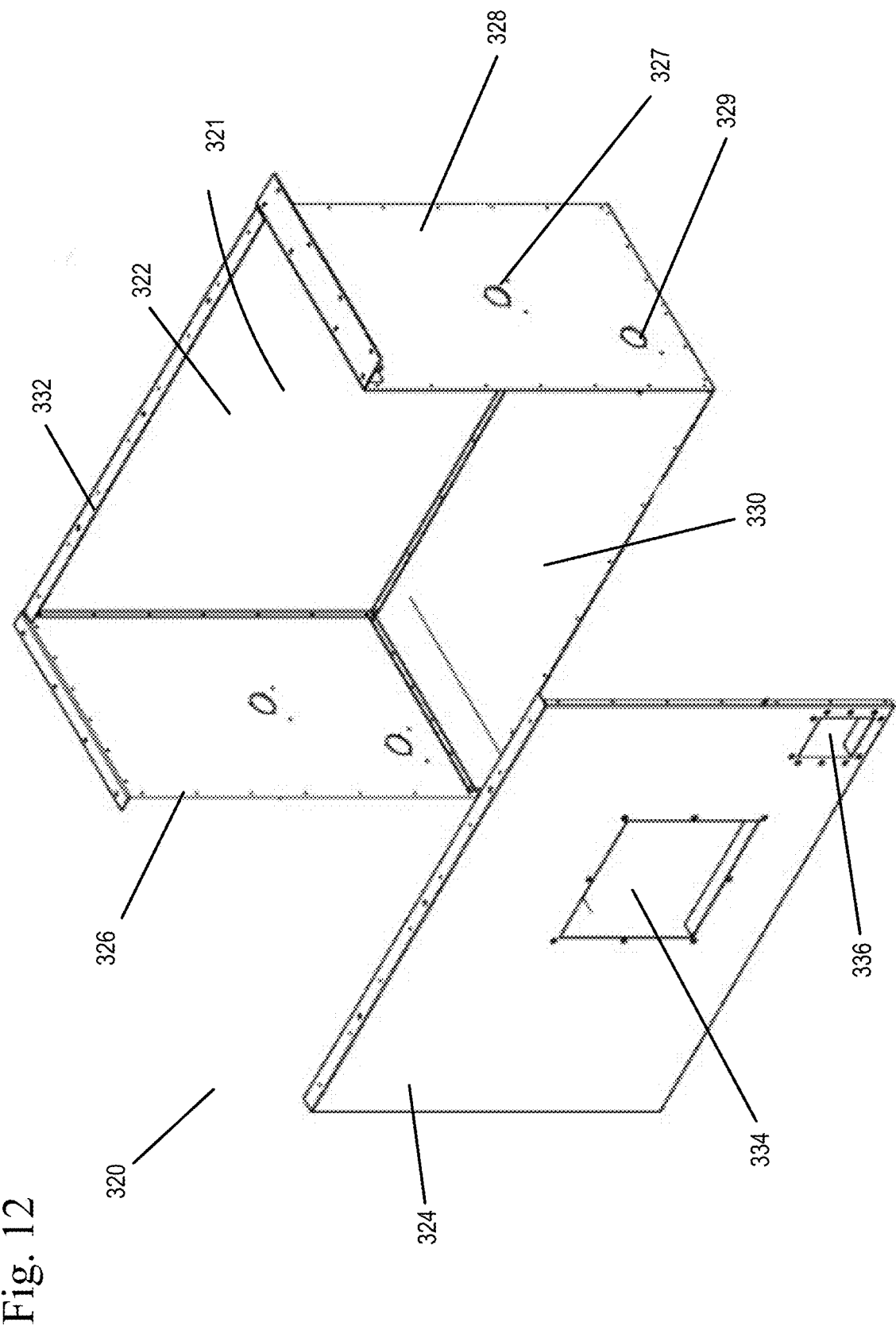
FIG. 12 shows an outer sleeve of the ice storage bin.
Figure 13:
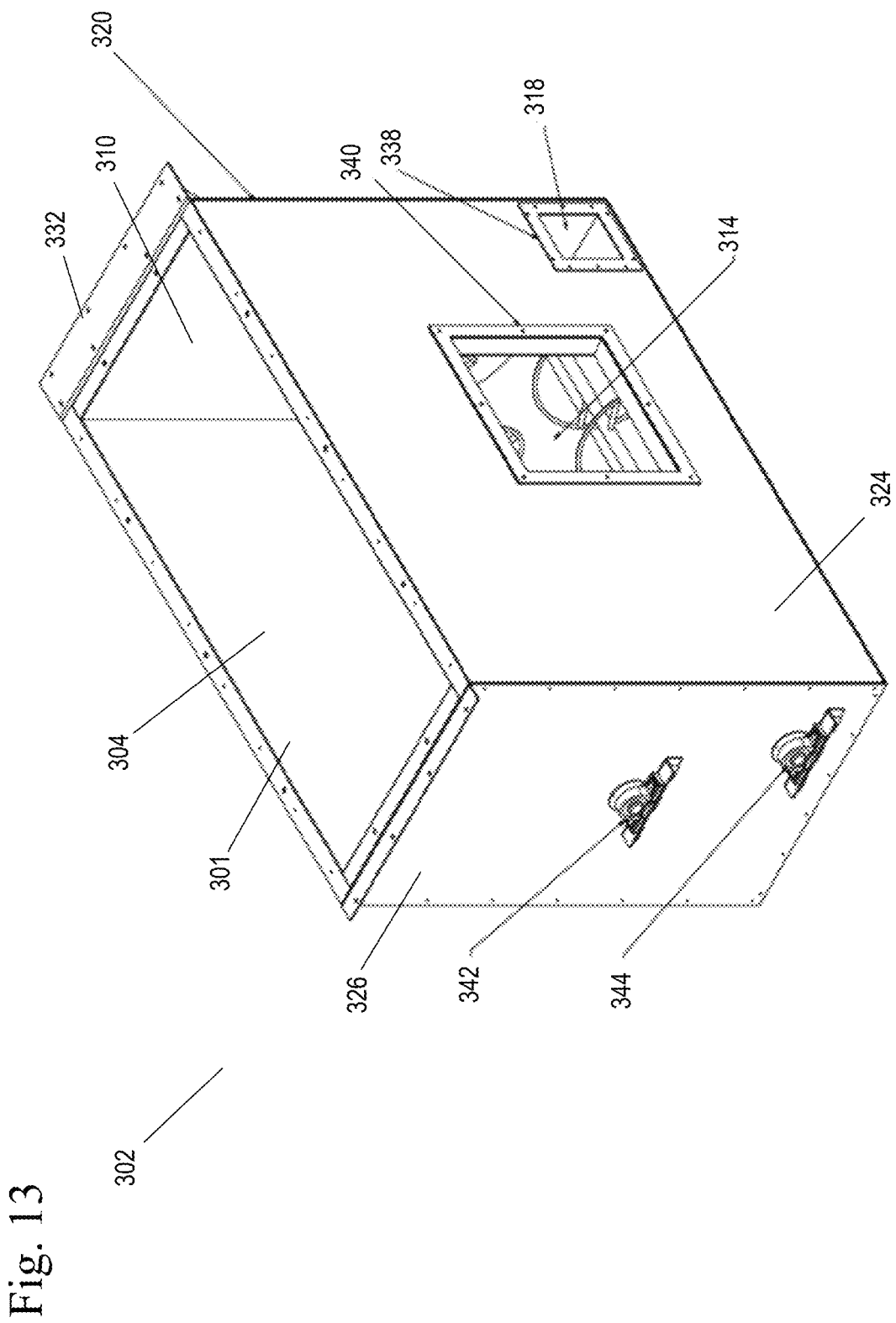
FIG. 13 shows a prospective view of the ice storage bin.
Figure 14:
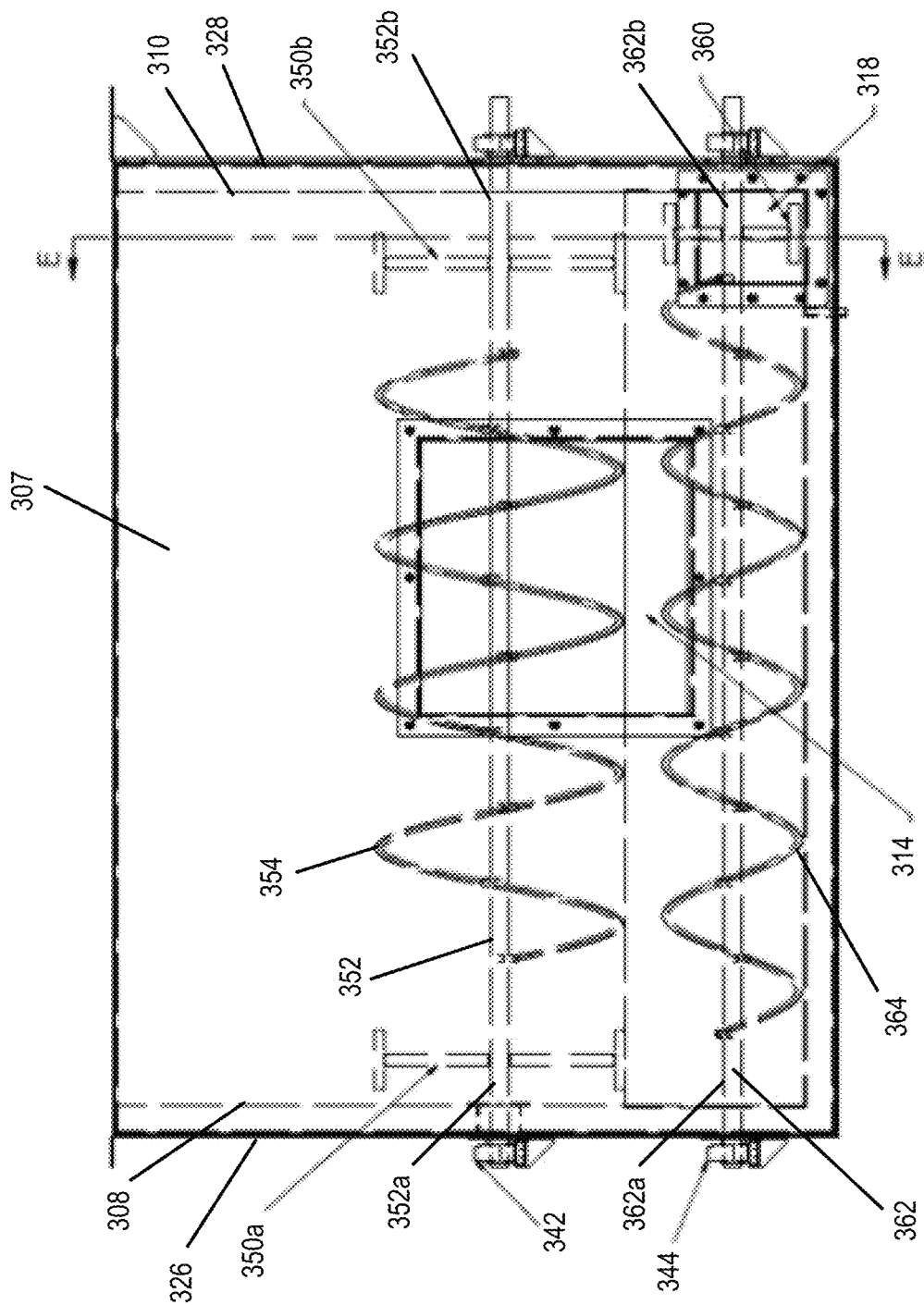
FIG. 14 shows a sectional view of the ice storage bin.
Figure 15:
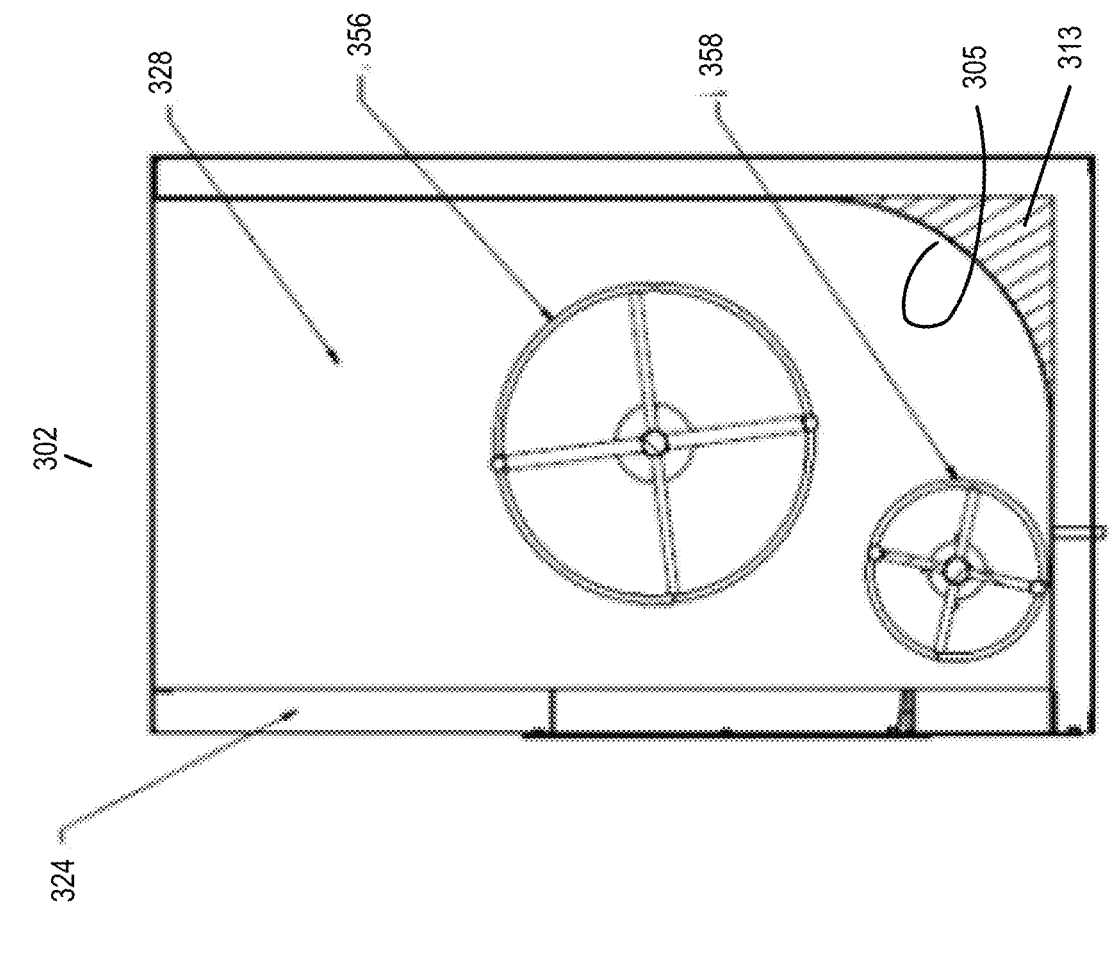
FIG. 15 shows a sectional view along line E-E of FIG. 14.

As shown in FIGS. 8-10, the rolling rack 400 is preferably square or rectangular and has four sides 403a-403d with each side 403a-403d defined by a top rail 406, two side rails 402 each with a first end 402a and a second end 402b, and a bottom rail 408. A center side rail 410 is also present parallel to and between the top rail 406 and the bottom rail 408. Another center side rail 413 may connect to both the top rail 406 and the bottom rail 408. Spanning the four sides 403a-403d of the top rail 406 is a top surface 401. Each of the four sides 403a-403d additionally has casters 414 connected to the bottom rail 408. Spanning the four sides 403a-403d of the bottom rail 408 is a bottom surface 411. A shelf 412 can additionally be present, connected to the bottom surface 411 and at least one of the side rails 402 adjacent the second end 402b of the side rail 402. Additional support rails can be present on the on the rolling rack 400 to aid supporting the ice maker 150 and the ice storage bin 302. A drain line 416 can also be attached to the bottoms surface 411 of the rack 400.

By using a moveable rack 400 to store the ice vending machinery, access for cleaning and maintenance of the ice maker 150 and the ice storage bin 302 and the vertical incline auger assembly 250 is increased. Furthermore, flexible refrigerant lines and plumbing lines are also used to allow some movement of the moveable rack 400 relative to the insulated front wall 109 without having to disconnect the machinery from the insulated front wall 109. Channel brackets 201 provide support to electrical connections between the ice vending machinery and the insulated front wall 109 as well as act as guide or connection point between ice storage bin 302 and the insulated front wall 109, to position the ice storage bin 302 in the correct place (e.g. relative to the water line in 128, refrigeration lines 131 and drain 129) and also to provide desired vend performance.

The ice maker 150 is present on the top surface 401 of the rolling rack 400. The ice storage bin 302 is present within the four sides 403a-403d of the rack 400. Motors 372, 380 associated with an agitator auger 356 and a horizontal auger 358 are preferably supported by the shelf 412. The ice maker 150 generates ice which is deposited into the ice storage bin 302.

Referring to FIGS. 8-14, the ice storage bin 302 has an outer sleeve 320 which receives an inner sleeve 301. The inner sleeve 301 has a front plate 306 defining an access opening 314 with an access opening flange 312 and an auger opening 318 with an auger opening flange 316. The front plate 306 is connected to a left plate 308, a right plate 310 and a rear plate 304. The rear plate 304 additionally forms a bottom 305 which is connected to the left plate 308, the right plate 310 and the front plate 306. The bottom 305 is preferably curved. The right plate 310, the left plate 308, the front plate 306 and the rear plate 304 all define an inner sleeve opening 307. The upper edges of the rear plate 304, the front plate 306, the left plate 308 and the right plate 310 all have outer trim 303. The left plate 308 and the right plate 310 each have a first opening 309 and a second opening 311 to receive shaft ends of an agitator shaft 352 and a horizontal auger shaft 362. The inner sleeve 301 preferably made of stainless steel. The access opening flange 312 and the auger opening flange 316 are also preferably made of stainless steel.

The outer sleeve 320 has a front plate 324 defining an access opening 334 which is aligned with the access opening 314 of the inner sleeve 301 and an auger opening 336 which is aligned with auger opening 318 of the inner sleeve 301. The outer sleeve 320 is preferably made of aluminum except for the front plate 324 which is preferably made of stainless steel.

The front plate 324 is connected to a left plate 326, a right plate 328 a rear plate 322 and a bottom plate 330. The right plate 328, the left plate 326, the front plate 324, the bottom plate 330, and the rear plate 322 all define an outer sleeve opening 321. The upper edges of the rear plate 322, the front plate 324, the left plate 326 and the right plate 328 all have outer trim 332 in which outer trim 303 of the inner sleeve 301 rests. The left plate 326 and the right plate 328 each have a first opening 327 and a second opening 329 to receive shaft ends of an agitator shaft 352 and a horizontal auger shaft 362 and which are aligned with the first opening 309 and the second opening 311 of the left and right plates 308, 310 of the inner sleeve 301. Insulation 313 may be present between the inner and outer sleeve 301, 320 between the rear plate 322 and the bottom plate 330 of the outer sleeve 320 and the rear plate 304 and the curved bottom 305 of the rear plate 304 of the inner sleeve 301. The insulation reduces heat transfer between the inner and outer sleeves 301, 320. Based on the design of the ice storage bin 302, it is recognized that ice only comes into contact with stainless steel.

Within the inner sleeve opening 307 of ice storage bin 302 is an agitator auger shaft 352 and a horizontal auger shaft 362. The agitator auger shaft 352 has a first end 352a which is secured to the left plates 308, 326 by a bearing 342 in the first openings 309, 327 and a second end 352b secured to right plates 310, 328 by an agitator auger driven sprocket 370. The agitator auger shaft 352 between the first end 352a and the second end 352b has a first agitator auger paddle 350a and a second agitator auger paddle 350b. Between the first and second agitator auger paddles 350a, 350b and mounted to the agitator auger shaft 352 are a spiral or helical agitator blade 354. The spiral or helical agitator blade 354 and the agitator sugar shaft 352 are preferably stainless steel. The agitator auger 352 agitates and moves ice created by the ice maker 150 and stored in the ice storage bin 302. The time and frequency of the ice movement by the agitator auger 352 can be determined and set as needed to prevent ice buildup and large ice blocks forming. The agitator auger 352 preferably agitates the ice during ice vending. The agitator auger 352 is driven by an agitator auger motor 372 through an auger drive chain 374 wrapped around the agitator auger driven sprocket 370. The auger drive chain 374 is tensioned by a chain tensioner 376. The agitator auger motor 372 receives feedback from the electrical control box 125.

The horizontal auger shaft 362 has a first end 362a which is secured to the left plates 308, 326 by a bearing 344 in the second openings 311, 329 and a second end 362b secured to right plates 310, 328 by a horizontal auger driven sprocket 378. The horizontal auger shaft 362 has a horizontal auger paddle 360 at the second end 362b. Between the first and second ends 362a, 362b of the horizontal auger shaft 362 is a spiral auger blade 364. The horizontal auger 358 moves ice towards the auger opening 318, 336. The horizontal auger 358 is driven by a horizontal auger motor 380 through a horizontal auger drive chain 382 via the horizontal auger sprocket 378. The horizontal auger drive chain 382 is tensioned by a chain tensioner 384. The horizontal auger motor 380 receives feedback from the electrical control box 125.

An access door 300 can be removably attached to the access opening access opening 314, 334 of the ice storage bin 302 to allow for maintenance as necessary.

Figure 18:
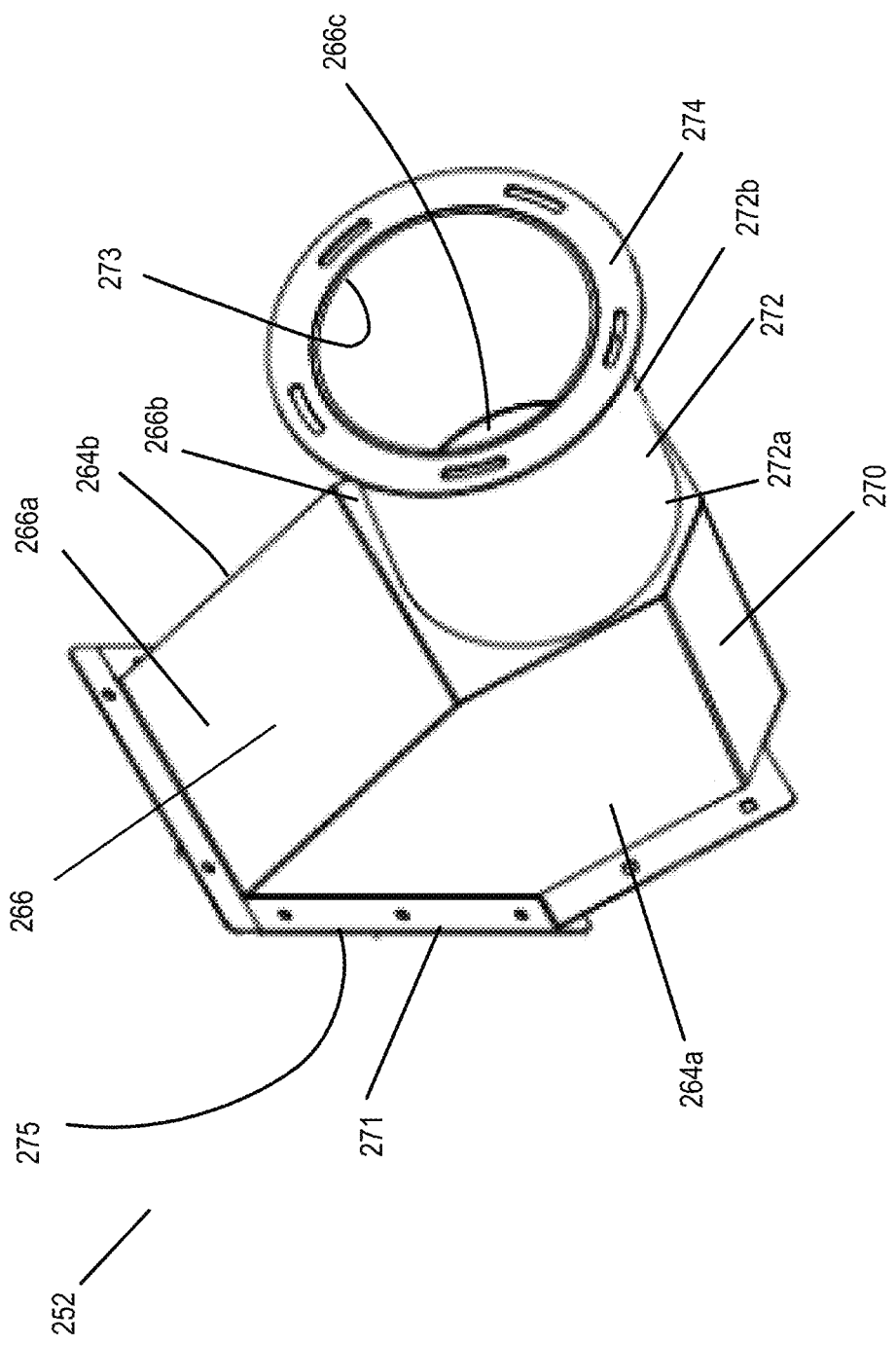
FIG. 18 shows a prospective view of the auger transfer box.

Ice that flows from the auger opening 318, 336 of the ice storage bin 302 flows into an opening 275 of transfer box 252. Referring to FIG. 18, the transfer box 252 has a first squared angular side 264a and a second squared angular side 264b connected to a bottom plate 270 and a top plate 266 with a first angular face 266a and a second angular face 266b. The second angular face 266b has an opening 266c and is connected to a first end 272a of a hollow pipe 272 defining a bore 273. The second end 272b of the hollow pipe 272 has a flange 274. An edge of the first angular face 266a of the top plate 266 and an edge of the first and second angular sides 264a, 264b are connected to an outer perimeter flange 271. The outer perimeter flange 271 is coupled to the ice storage bin 302 at the auger opening 318, 336.

Figure 17:
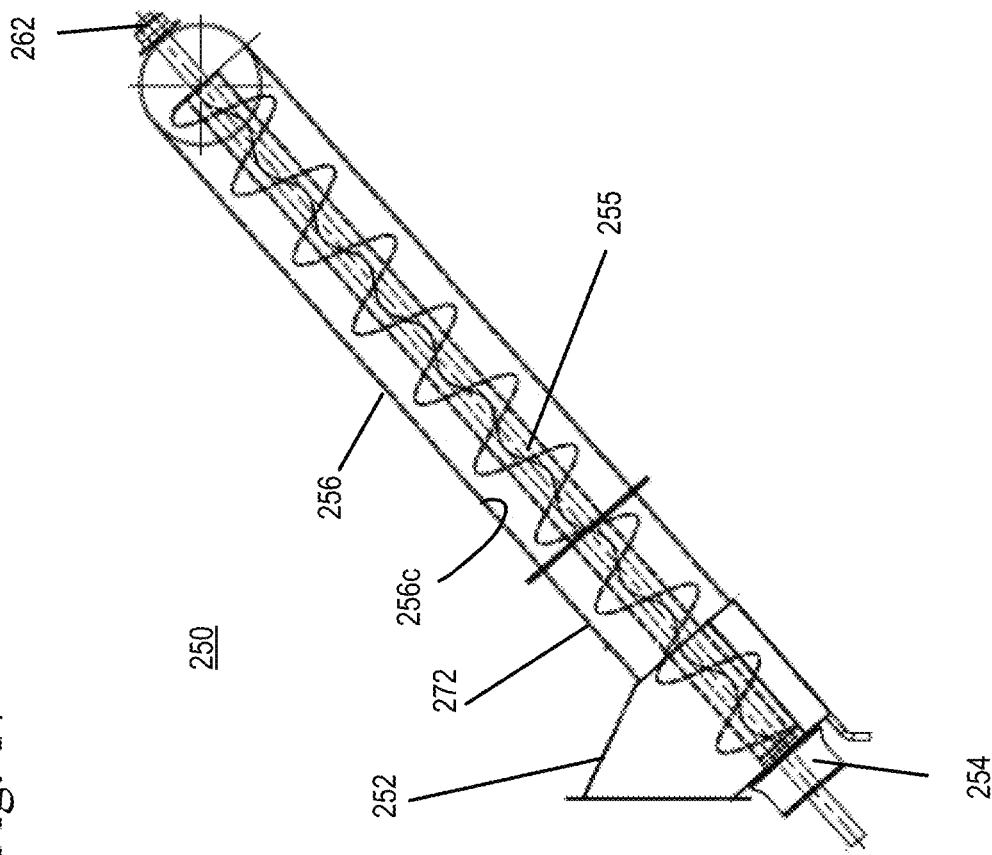
FIG. 17 shows a sectional view of the vertical/incline auger assembly.
Figure 16:
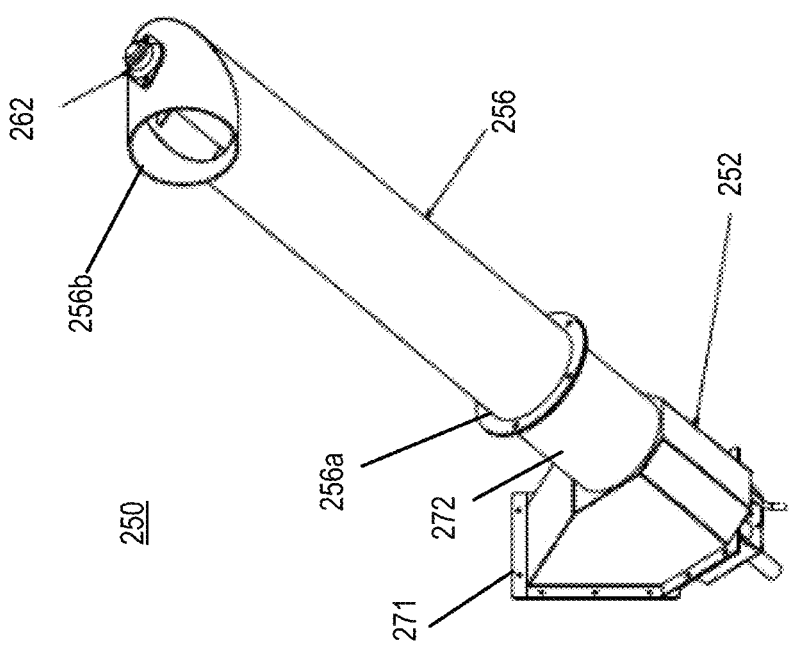
FIG. 16 shows a prospective view of a vertical/incline auger assembly.

FIGS. 16-17 show the vertical incline auger assembly 250. A hollow pipe 256 has a first end 256a, a second bent end 256b and a hollow interior 256c. The second bent end 256b has a flange bearing 262 which attaches to the bagging mechanism 130. The first end 256a of the pipe 256 is received within the hollow pipe connection 272 of the transfer box 252. Within the hollow interior 256c is a screw conveyor 255 with blades or paddles 257 for moving ice from the transfer box 252 up to the bagging mechanism 130 to bag and dispense the ice. The screw conveyor 255 is rotated by the include/vertical auger motor 254.

FIGS. 24-28 show a split shipping frame to secure the insulated front wall 109 and customer interface 100 during shipping as well for onsite installation. The split shipping frame 430 has a left two-piece side rail 432 and a right two-piece side rail 434. Between the left two-piece side rail 432 and the right two-piece side rail 434 is a first horizontal rail 436, a second horizontal rail 438, a third horizontal rail 440 and a fourth horizontal rail 442. The left two-piece side rail 432 has a first piece side rail 432a and a second piece side rail 432b. The right two-piece side rail 434 has a first piece side rail 434a and a second piece side rail 434b. The first horizontal rail 436 and the second horizontal rail 438 are connected to the first piece side rail 434a of the right two-piece side rail 434 and the first piece side rail 432a of the left two-piece side rail 432.

An upright first support side 444 is connected to the first piece side rail 432a of the left two-piece side rail 432. An upright second support side 446 is connected to the first piece side rail 434a of the right two-piece side rail 434.

A first left sliding leg 450 is connected to the first horizontal rail 436 and the second horizontal rail 438. A second left sliding leg 454 is connected to the third horizontal rail 440 and the fourth horizontal rail 442. A first right sliding leg 452 is connected to the first horizontal rail 436 and the second horizontal rail 438. A second right sliding leg 456 is connected to the third horizontal rail 440 and the fourth horizontal rail 442.

Between the left side rail 432 and the first left sliding leg 450 is first caster 448a coupled to the first horizontal rail 436. Between the left side rail 432 and the first left sliding leg 450 is a second caster 448b coupled to the second horizontal rail 438. Between the left side rail 432 and the second left sliding leg 454 is a third caster 448c coupled to the third horizontal rail 440. Between the left side rail 432 and the second left sliding leg 454 is a fourth caster 448d coupled to the fourth horizontal rail 442. Between the right side rail 434 and the first right sliding leg 452 is a fifth caster 448e coupled to the first horizontal rail 436. Between the right side rail 434 and the first right sliding leg 452 is a sixth caster 448f coupled to the second horizontal rail 438. Between the right side rail 434 and the second right sliding leg 456 is a seventh caster 448g coupled to the third horizontal rail 440. Between the right side rail 434 and the second right sliding leg 456 is an eighth caster 448h coupled to the fourth horizontal rail 442.

Each of the sliding legs 450, 452, 454, 456 has U-shaped bracket 460 defining a U-shaped crevice 462. Within the U-shaped crevice 462 is a hole 464. The U-shaped bracket 460 slidingly receives a top cover 472 which either covers or exposes hole 464. The hole 464 receives a screw rod 466 with threads 468. The screw rod 466 is maintained in position within the hole 464 by nut 470 and provides a locking mechanism to prevent further sliding while the screw rod 466 is under load. At an end of the screw rod 466, a driver nut 474 is welded for ease of moving the insulated front wall 109 and customer interface 100 up and down using an impactor, wrench or other manual tools.

Figure 25:
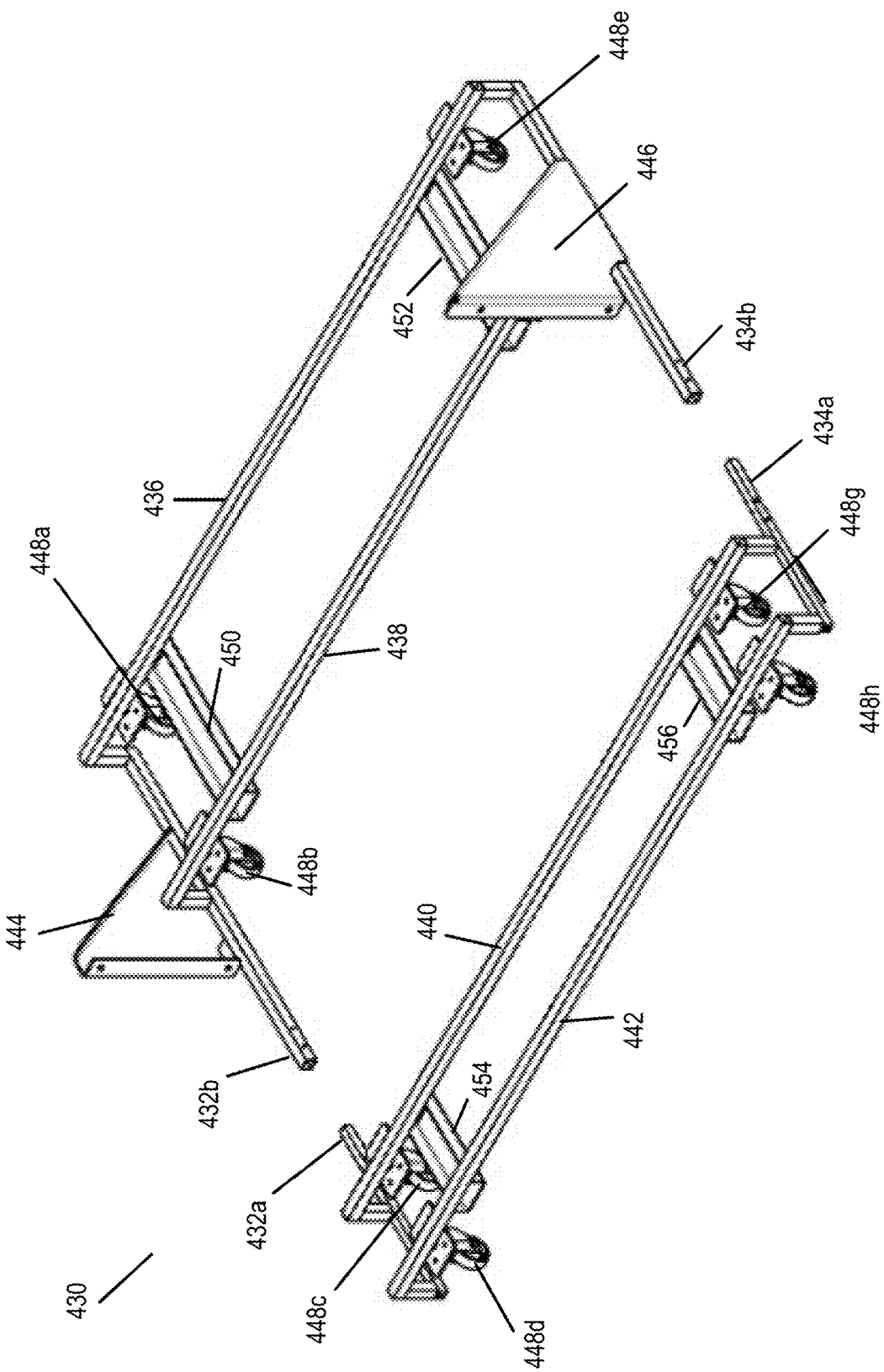
FIG. 25 shows a view of the split design shipping frame in a separated position.
Figure 26:
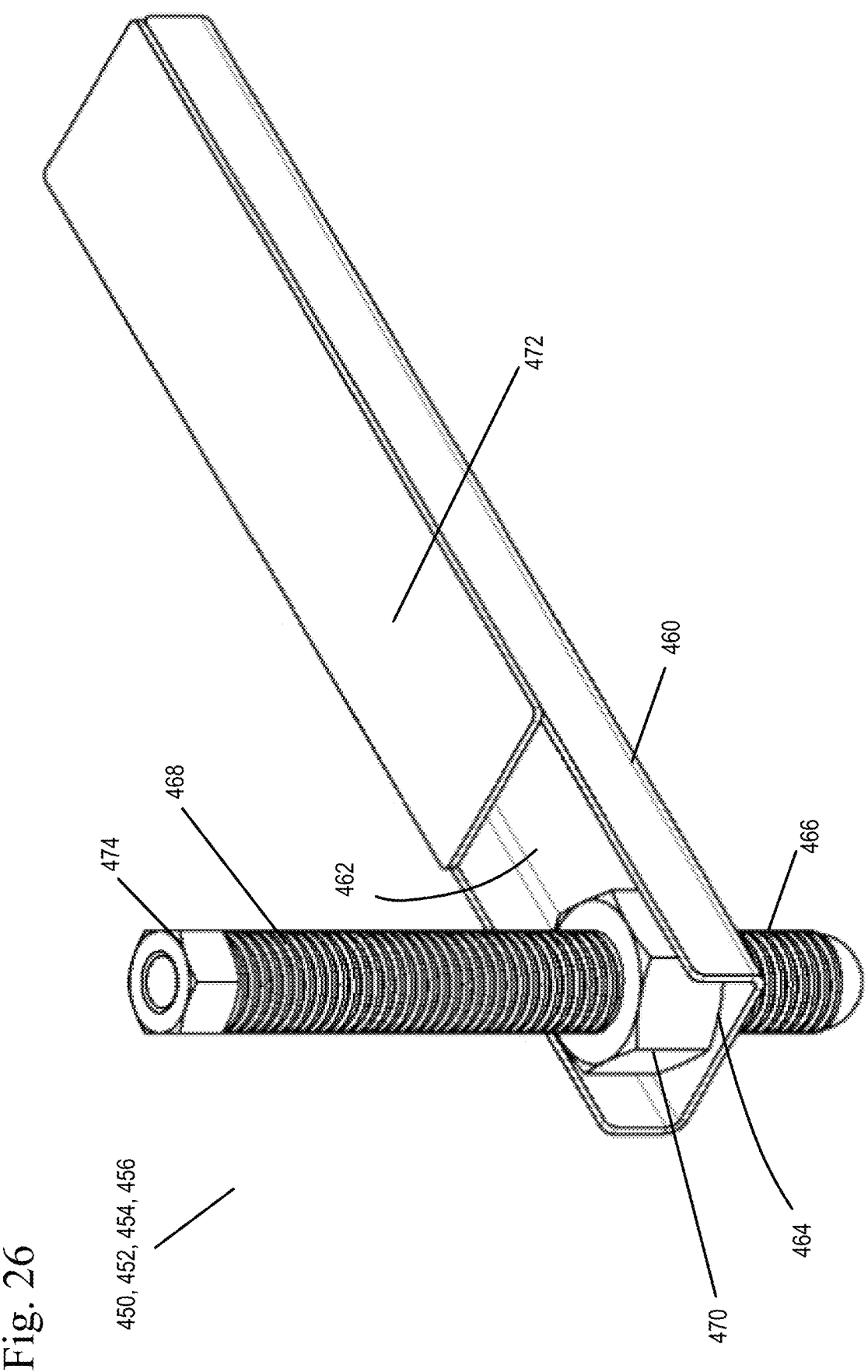
FIG. 26 shows a screw jack design to remove the shipping frame from the shipping pallet.
Figure 27:
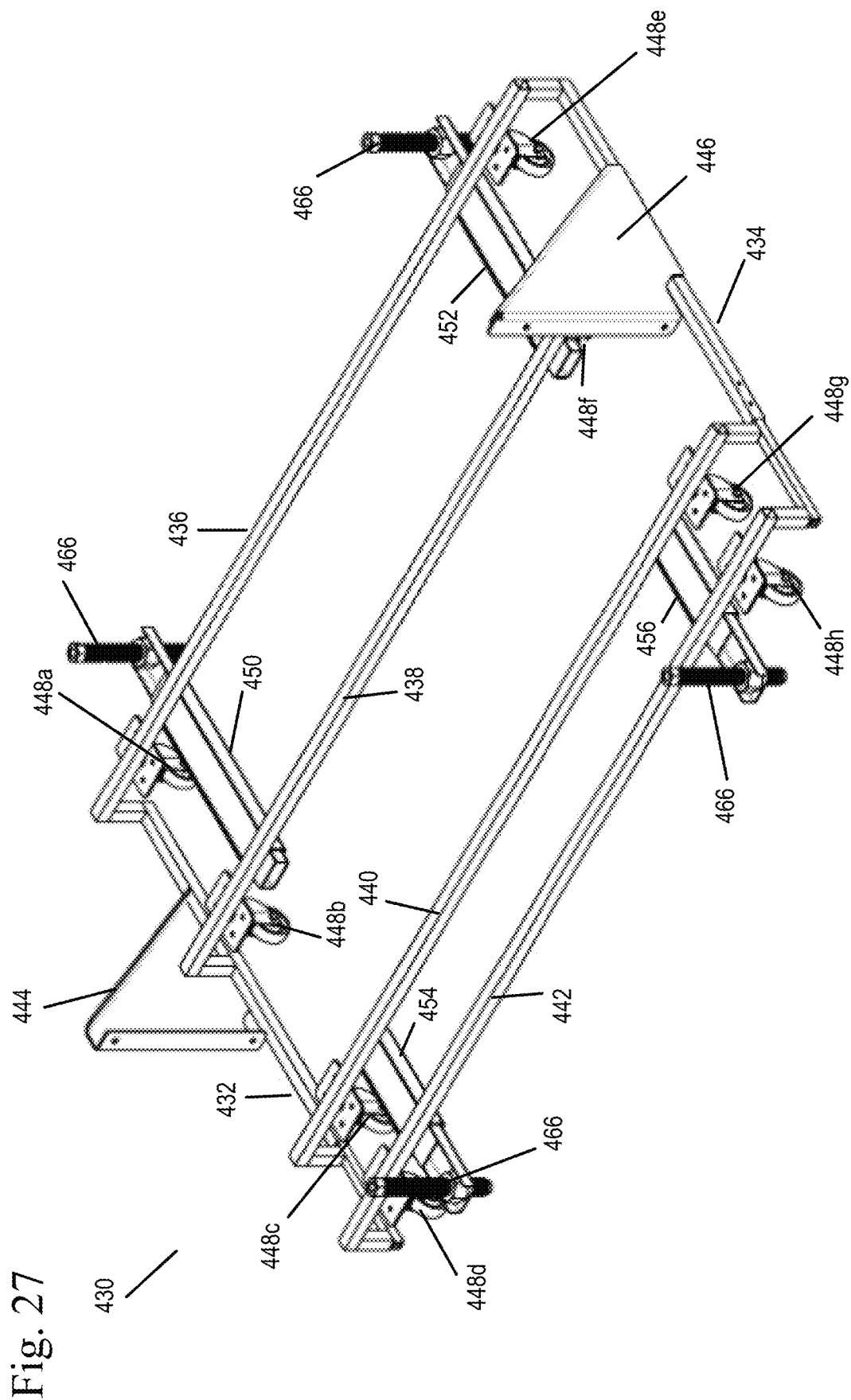
FIG. 27 shows the screw jack on the split design shipping frame.
Figure 28:
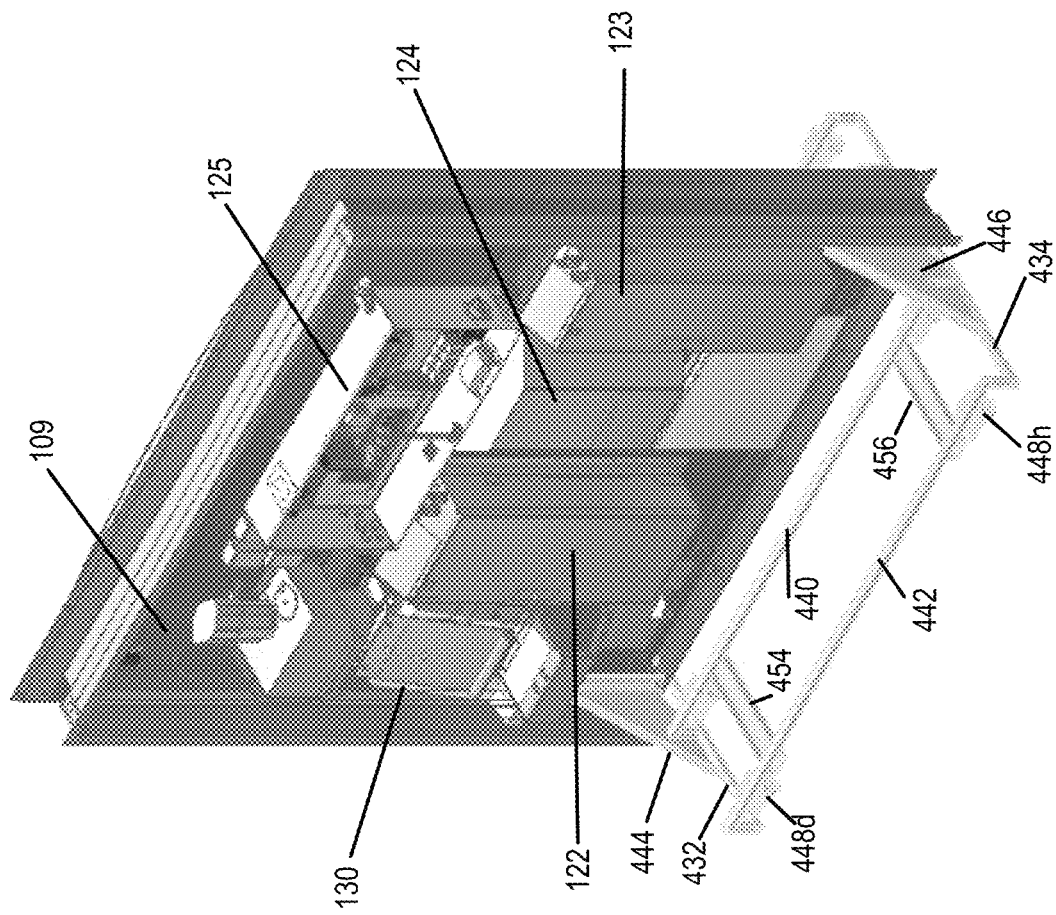
FIG. 28 shows the split design shipping frame with the insulated wall.

A split position of the split shipping frame 430 is shown in FIG. 25. The non-split position is shown in FIGS. 24, 27 and 28. The insulated front wall assembly is maintained upright between the upright first support side 444 and the third horizontal rail 440 and the upright second support side 446 and the third horizontal rail 440. The casters 448a-448h are installed at a low profile to allow ease of movement during assembly, shipping and transportation. Additionally, as the insulated front wall 109 and customer interface 100 are installed, the top cover 472 of the left sliding legs 450, 454 and the right sliding legs 452, 456 are slidably removed such that a screw rod 468 can be inserted into each hole 464 of the left sliding legs 450, 454 and the right sliding legs 452, 456 until the screw rod 468 interacts with a ground surface. The first piece side rail 432a is decoupled from the second piece side rail 432b and the first piece side rail 434a is decoupled from the second piece side rail 434b and is moved to the split position and the shipping frame 430 can be moved away.

During the installation process, the rolling rack 400 including the insulated front wall 109 is rolled to the onsite construction wall opening in the outer store wall 101, such a way that the customer interface 100 faces outside of the building. The insulated front wall 109 is supported using wooden wedges/spacers positioning at bottom of front wall 109. The first piece side rail 432a is decoupled from the second piece side rail 432b and the first piece side rail 434a is decoupled from the second piece side rail 434b by removing fasteners and is moved to the split position and the shipping frame 430 can be moved away. The wooden wedges and spaces are then removed and the insulated front wall 109 is lowered to the ground. The insulated front wall 109 is then positioned into the opening of the outer store wall 101. The insulated front wall 109 is then manually tilted and inserted into the opening of the outer store wall 101 and a sealant is preferably applied to surface of the outer store wall 101 where the outer wall trim 102 mates with the outer store wall 101. Fasteners 110 are also used to install the vendor front back panel 107 to the insulated front wall as well as inner wall trim 103. Fasteners 104 are used to fasten the outer trim 102 to the outer store wall 101 after the vendor front back panel 107 has been attached to the insulated front wall 109.

REFERENCE NUMBERS 100 ice water vending store front/customer interface
101 outer store wall
102 outer wall trim
103 inner wall trim
104 fasteners
105a top, front bubble backlit panel
105b middle flat panel
105c bottom, front bubble backlit panel
106 LED backlight
107 vendor front back panel
107a vendor front back panel top
107b vendor front back panel bottom
108 opening water vending
109 insulated front wall
110 fasteners
111 bottom trim
112 coin insert (ice)
113 bill validator (ice)
114 credit card reader (ice)
115 vendor select buttons (ice)
116 coin return chute (ice)
117 vendor select buttons (water)
118 coin return chute (water)
119 water vendor payment
120 water vendor access door
121 bag chute
122 ice payment area
123 water payment box
124 water vendor
125 electrical control box
126 electrical power IN
127 electrical power OUT
128 water in
129 drain
130 bagging mechanism
131 refrigeration line
150 ice maker 201 channel bracket
250 vertical incline auger assembly
252 transfer box
254 incline/vertical auger motor
255 screw conveyor
256 pipe
256a first end
256b second bent end
256c hollow interior
257 blades
262 flange bearing
264a first squared angular side
264b second squared angular side
266 top plate
266a first angular face
266b second angular face
266c opening
270 bottom plate
271 outer perimeter flange
272 hollow pipe connection incline auger
272a first end
272b second end
273 bore
274 flange for incline auger
275 opening
301 inner sleeve ice storage bin
302 complete storage bin
303 top trim inner sleeve
304 rear plate inner sleeve
305 bottom inner sleeve
306 front plate inner sleeve
307 inner sleeve opening
308 left plate inner sleeve
309 first opening inner sleeve
310 right plate inner sleeve
311 second opening inner sleeve
312 access opening flange
313 insulation
314 access opening
316 auger opening flange
318 auger opening
320 outer sleeve ice storage bin
321 outer sleeve opening
322 rear plate outer sleeve
324 front plate outer sleeve
326 left plate outer sleeve
327 first opening
328 right plate outer sleeve
329 second opening
330 bottom plate outer sleeve
332 top outer trim outer sleeve
334 access opening
336 auger opening
342 agitation auger bearing
344 horizontal auger bearing
350a first agitator auger paddle
350b second agitator auger paddle
352 agitator shaft
354 agitator blades
356 agitator auger
358 horizontal auger
360 horizontal auger paddle
362 shaft
364 auger blade
370 agitator auger driven sprocket
372 agitator auger motor
374 auger drive chain
376 chain tensioner auger drive chain
378 horizontal auger driven sprocket
380 horizontal auger motor
382 horizontal auger drive chain
384 chain tensioner horizontal auger drive chain
400 rolling rack
401 top rack surface
402 side rails
402a first end of side rail
402b second end of side rail
403a-403d sides of rack
406 top rail
408 bottom rail
410 center side rail
411 bottom surface
412 shelf
413 center side rail
414 casters
416 drainage pipe
430 split shipping frame
432 left two-piece side rail
432a first piece side rail
432b second piece side rail
434 right two-piece side rail
434a first piece side rail
434b second piece side rail
436 first horizontal rail
438 second horizontal rail
440 third horizontal rail
442 fourth horizontal rail
444 first support side
446 second support side
448a-448h caster
450 first left sliding leg
452 first right sliding leg
454 second left sliding leg
456 second right sliding leg
460 U-shaped bracket
462 U-shaped crevice
464 hole
466 screw rod
468 threads
470 nut
472 top cover
474 driver nut
502a first bag chute side
502b second bag chute side
503 first end of chute side
504 front plate of bag chute
505 curved surface
507 second end of chute side
508 bag roll
509 bottom plate
520a rectangular coin chute
520b angled face
522 back bracket coin return chute
550 ice hopper
552 fixed bottom panel
553 rotating bottom panel
554 ice level sensors
555 hinge
556 actuator
557 blower
558 space
559 ice bagging structure
559a side panel
559b side panel 559c back panel
559d bottom panel
560 bag holder
561 bag detect flap Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A shipping frame for an insulated front wall with a customer interface comprising:
   a left two piece side rail comprising a first left piece and a second left piece;
   a right two piece side rail, parallel to the left two piece side rail comprising a first right piece and a second right piece;
   a first horizontal rail mounted to the first left piece and the first right piece;
   a second horizontal rail mounted to the first left piece and the first right piece;
   a third horizontal rail mounted to the second left piece and the second right piece;
   a fourth horizontal rail mounted to the second left piece and the second right piece;
   a first upright support mounted to the first left piece;
   a second upright support mounted to the first right piece;
   a first left sliding leg mounted to the first horizontal rail and the second horizontal rail;
   a second left sliding leg mounted to the third horizontal rail and the fourth horizontal rail;
   a first right sliding leg mounted to the first horizontal rail and the second horizontal rail; and
   a second right sliding leg mounted to the third horizontal rail and the fourth horizontal rail;
   wherein the insulated front wall is secured within the shipping frame and received between the first upright support and the second horizontal rail, the second upright support and the second horizontal rail and located between the second horizontal rail and the third horizontal rail.

2. The shipping frame of claim 1, further comprising a first pair of casters mounted to the first horizontal rail; a second pair of casters mounted to the second horizontal rail; a third pair of casters mounted to the third horizontal rail; and a fourth pair of casters mounted to the fourth horizontal rail.

3. The shipping frame of claim 1, wherein each of the first and second left sliding rails and each of the first and second right sliding rails each comprises: a U-shaped bracket defining a hole; a cover slidably received by the bracket to cover the hole; and a screw rod receivable in the hole.

4. The shipping frame of claim 3, wherein when the insulated front wall is being installed, the cover of each of the first and second left sliding rails and each of the first and second right sliding rails are slidably removed such that a screw rod can be inserted into each hole of the first and second left sliding rails and the first and second right sliding rails until the screw rod interacts with a ground surface and the second left piece is uncoupled from the first left piece and the second right piece is uncoupled from the second right piece and the second right piece and the second left piece are wheeled away from the first left piece and the first right piece via pairs of casters attached to the horizontal rails.

5. An inline vending system for vending ice and/or water comprising:
   a) an inline vending unit received within an opening of an exterior wall of a building, wherein the building includes items for sale other than ice and water, the inline vending unit comprising:
      an insulated front wall received within the opening of the exterior wall, wherein the insulated front wall is a separate structure from the building;
      a unitary vendor front panel mounted to the insulated front wall, the unitary vendor front panel comprising a vendor front top panel connected to a vendor front bottom panel through a flat panel;
      a bagging mechanism comprising a bag chute mounted to the vendor front bottom panel of the unitary vendor front panel for vending ice;
      a water vendor access hole defined by the flat panel of the unitary vendor front panel for receiving a receptacle to vend water into;
      a top bubble front panel mounted to the vendor front top panel of the unitary vendor front panel; and
      a bottom bubble front panel mounted to the vendor front bottom panel of the unitary vendor front panel;
   b) an ice maker for generating ice;
   c) an ice storage bin for receiving ice from the ice maker, the ice storage bin comprising:
      an inner sleeve having an inner sleeve front panel, an inner sleeve back panel, a first inner sleeve side panel, a second inner sleeve side panel and a curved bottom defining an inner sleeve opening, wherein the inner sleeve front panel defines an inner sleeve first opening and an inner sleeve second opening;
      an outer sleeve comprising an outer sleeve front panel, an outer sleeve back panel, a first outer sleeve side panel, and a second outer sleeve side panel, and a bottom defining an outer sleeve opening, the outer sleeve front panel defining a first outer sleeve opening and a second outer sleeve opening;
      wherein the outer sleeve opening receives the inner sleeve, such that the first inner sleeve opening of the inner sleeve front panel aligns with the first outer sleeve opening of the outer sleeve front panel, the second inner sleeve opening of the inner sleeve front panel aligns with the second outer sleeve opening of the outer sleeve front panel, and a space is generated between the inner sleeve bottom and the outer sleeve bottom;
   d) an agitator auger received within the ice storage bin comprising: a shaft having a first end and a second end; a helical blade mounted to the shaft between the first end and the second end; a first agitator paddle mounted to the first end of the shaft and a second agitator paddle mounted to the second end of the shaft;
   e) a horizontal auger received within the ice storage bin comprising: a shaft having a first end and a second end; an auger paddle mounted to the second end and aligned with the second inner sleeve opening of the inner sleeve front panel and the second outer sleeve opening of the outer sleeve front panel;
   f) a transfer box mounted to the second outer sleeve opening of the outer sleeve front panel; and
   g) a vertical incline auger assembly coupled to the transfer box and the bagging mechanism;
   wherein ice from the ice maker passes into the ice storage bin, through the second inner sleeve opening and the second outer sleeve opening via the horizontal auger into the transfer box, through the vertical incline auger and into a bag in the bag chute of the front panel.

6. The inline vending system of claim 5, wherein the inner sleeve and the outer sleeve front panel are made of stainless steel and the outer sleeve back panel, a first outer sleeve side panel, and a second outer sleeve side panel, and a bottom are made of aluminum.

7. The inline vending system of claim 5, further comprising insulation in the space between the curved bottom of the inner sleeve and the bottom of the outer sleeve.

8. The inline vending system of claim 5, further comprising a rack for receiving the ice storage bin and the ice maker, the rack comprising a top surface, a bottom surface, a plurality of sides each having a first end connected to the top surface and a second end connected to a bottom surface; and a shelf connected to at least one of the plurality of sides and the bottom surface.

9. The inline vending system of claim 8, further comprising a channel bracket connecting the insulated front wall panel to the rack.

10. The inline vending system of claim 8, wherein the rack further comprises a plurality of casters mounted to the bottom surface of the rack.

11. The inline vending system of claim 8, wherein the rack is at least 32 inches from the insulated front wall panel.

\* \* \* \* \*